US011015954B2

(12) United States Patent
Khedr et al.

(10) Patent No.: US 11,015,954 B2
(45) Date of Patent: May 25, 2021

(54) STEP DETECTION USING IMU AND MAGNETOMETER DATA FUSION

(71) Applicant: UTI LIMITED PARTNERSHIP, Calgary (CA)

(72) Inventors: Maan Essam Khedr, Calgary (CA); Naser El-Sheimy, Calgary (CA)

(73) Assignee: UTI Limited Partnership, Calgary (CA)

( * ) Notice: Subject to any disclaimer, the term of this patent is extended or adjusted under 35 U.S.C. 154(b) by 285 days.

(21) Appl. No.: 16/158,557

(22) Filed: Oct. 12, 2018

(65) Prior Publication Data
US 2019/0113364 A1    Apr. 18, 2019

Related U.S. Application Data

(60) Provisional application No. 62/572,854, filed on Oct. 16, 2017.

(51) Int. Cl.
G01C 21/00 (2006.01)
G01C 22/00 (2006.01)
G01C 19/00 (2013.01)
G01C 21/16 (2006.01)

(52) U.S. Cl.
CPC ........... G01C 22/006 (2013.01); G01C 19/00 (2013.01); G01C 21/165 (2013.01)

(58) Field of Classification Search
CPC .... G01C 22/006; G01C 19/00; G01C 21/165; G01C 21/16

USPC ......................................................... 702/160
See application file for complete search history.

(56) References Cited

U.S. PATENT DOCUMENTS

| 7,171,331 | B2* | 1/2007 | Vock ....................... A43B 3/00 |
| | | | 702/160 |
| 2013/0191069 | A1 | 7/2013 | Ravindran |
| 2014/0066816 | A1* | 3/2014 | McNames ............ A61B 5/6831 |
| | | | 600/595 |
| 2014/0074431 | A1 | 3/2014 | Modi |
| 2014/0172361 | A1* | 6/2014 | Chiang ................ G01C 22/006 |
| | | | 702/160 |
| 2014/0278229 | A1* | 9/2014 | Hong ..................... A61B 5/486 |
| | | | 702/160 |

OTHER PUBLICATIONS

Ojeda, L. et al. Non-GPS navigation for security personnel and first responders. J. Navig. 2007, 60, 391-407, doi:10.1017/S0373463307004286.

Jimenez, A. R. et al. Indoor Pedestrian navigation using an INS/EKF framework for yaw drift reduction and a foot-mounted IMU. In Proceedings of the 2010 7th Workshop on Positioning, Navigation and Communication, WPNC'10; 2010.

(Continued)

Primary Examiner — Mischita L Henson
(74) Attorney, Agent, or Firm — Brion Raffoul

(57) ABSTRACT

Systems and methods for detecting and counting steps. Acceleration data is used to determine acceleration norms. Peaks and valleys in the resulting acceleration norms data are then detected. These peaks and valleys are indicative of steps and are validated using measurements from gyroscopes and magnetometers. The systems and methods can thus be used to assist in location tracking and/or navigation.

19 Claims, 14 Drawing Sheets

(56) References Cited

OTHER PUBLICATIONS

Foxlin, E. Pedestrian tracking with shoe-mounted inertial sensors. IEEE Comput. Graph. Appl. 2005, 25, 38-46, doi:10.1109/MCG.2005.140.

Pappas, I. P. I. et al. A reliable gait phase detection system. IEEE Trans. Neural Syst. Rehabil. Eng. 2001, 9, 113-125, doi:10.1109/7333.928571.

Yun, X. et al. Self-contained Position Tracking of Human Movement Using Small Inertial/Magnetic Sensor Modules. In Proceedings 2007 IEEE International Conference on Robotics and Automation; IEEE, 2007; pp. 2526-2533.

Young, S. S. et al. Pedestrian inertial navigation with gait phase detection assisted zero velocity updating. In ICARA 2009—Proceedings of the 4th International Conference on Autonomous Robots and Agents; 2009; pp. 336-341.

Park, S. K. et al. A zero velocity detection algorithm using inertial sensors for pedestrian navigation systems. Sensors (Basel). 2010, 10, 9163-9178, doi:10.3390/s101009163.

Xu, Z. et al. A robust method to detect zero velocity for improved 3d personal navigation using inertial sensors. Sensors (Switzerland) 2015, 15, 7708-7727, doi:10.3390/s150407708.

Norrdine, A. et al. Step Detection for ZUPT-Aided Inertial Pedestrian Navigation System Using Foot-Mounted Permanent Magnet. IEEE Sens. J. 2016, 16, 6766-6773, doi:10.1109/JSEN.2016.2585599.

Rawassizadeh, R. et al. Wearables: Has the Age of Smartwatches Finally Arrived? Commun. ACM 2014, 58, 45-47, doi:10.1145/2629633.

Case, M. A. et al. Accuracy of Smartphone Applications and Wearable Devices for Tracking Physical Activity Data. JAMA 2015, 313, 625, doi:10.1001/jama.2014.17841.

Huang, Y. et al. Activity monitoring using an intelligent mobile phone—A Validation Study. In Proceedings of the 3rd International Conference on Pervasive Technologies Related to Assistive Environments—PETRA '10; ACM Press: New York, New York, USA, 2010; p. 1.

Susi, M. et al. Motion mode recognition and step detection algorithms for mobile phone users. Sensors (Switzerland) 2013, 13, 1539-1562, doi:10.3390/s130201539.

Xiao, Z. et al. Robust pedestrian dead reckoning (R-PDR) for arbitrary mobile device placement. IPIN 2014—2014 Int. Conf. Indoor Position. Indoor Navig. 2015, 187-196, doi:10.1109/IPIN.2014.7275483.

Tian, Q.; et al. A Multi-Mode Dead Reckoning System for Pedestrian Tracking Using Smartphones. IEEE Sens. J. 2016, 16, 2079-2093, doi:10.1109/JSEN.2015.2510364.

Lee, H. H.; et al. Step detection robust against the dynamics of smartphones. Sensors (Switzerland) 2015, doi:10.3390/s151027230.

Kammoun, S.; et al. An efficient fuzzy logic step detection algorithm for unconstrained smartphones. In IEEE International Symposium on Personal, Indoor and Mobile Radio Communications, PIMRC; 2015.

Davidson, P.; et al. A Survey of Selected Indoor Positioning Methods for Smartphones. IEEE Commun. Surv. Tutorials 2017, 19, 1347-1370, doi:10.1109/COMST.2016.2637663.

Ozcan, K. et al. Robust and Reliable Step Counting by Mobile Phone Cameras. Proc. 9th Int. Conf. Distrib. Smart Cameras 2015, 164-169, doi:10.1145/2789116.2789120.

Marouane, C.; et al. Step and activity detection based on the orientation and scale attributes of the SURF algorithm. In 2016 International Conference on Indoor Positioning and Indoor Navigation (IPIN); IEEE, 2016; pp. 1-8.

* cited by examiner

STEP DETECTION USING IMU AND MAGNETOMETER DATA FUSION

RELATED APPLICATIONS

This application is a non-provisional patent application which claims the benefit of U.S. Provisional Application No. 62/572,854 filed on Oct. 16, 2017.

TECHNICAL FIELD

The present invention relates to pedometry. More specifically, the present invention relates to methods and systems for sensing and calculating a user's steps.

BACKGROUND OF THE INVENTION

Recent advances in Micro-Electro-Mechanical Systems (MEMS) technology has made it feasible to manufacture Inertial Measurement Units (IMU) sensors that are low cost and low on power consumption on chip while also being light in weight. Most of the smart devices in use by pedestrians these days are enabled with such technology. These and other characteristics have made such sensors suitable for use in field such as activity and health monitoring, gaming, personal navigation, and emergency services.

An IMU is a group of sensors that can sense the motion of the user represented as accelerations and angular rate changes of orientation. MEMS IMUs are low-grade sensors considered to be commercial-grade. MEMS IMUs suffer from high errors in comparison to higher quality IMUs that are considered to be tactical grade. Such high margins of error in MEMS IMUs lead to high positioning error over time when inertial measurements are accumulated. However, while tactical grade IMUs may be used, these are not practical for everyday users as they tend to be expensive, big, heavy, and require higher capacity power sources. In addition, such tactical IMUs, because of their need for such power sources, cannot be installed on smartphones.

Applications that attempt to track pedestrian motion and activity for navigation or health purposes usually require an accurate step detection technique. Step detection is of importance in health monitoring applications as step detection can be the basis for a number of other metrics to be measured. As an example, step count can be used to assess the physical activity level of the user and it can be used to provide feedback and to thereby motivate a more active life style for the user.

Navigation applications rely mainly on Global Navigation Satellite Systems (GNSS) as the main resource for positioning and tracking. GNSS systems are always undergoing modernizations that increase their coverage and accuracy, and although it can provide reliable positioning and navigation information in most cases, it suffers from degraded service in environments where the satellite signals are blocked, attenuated, or reflected. Such environments include urban canyons and indoors, where most human day-to-day activities take place. An alternative technology to GNSS is Inertial Navigation Systems (INS). Recent advances in INS have made this technology more appealing for use as a backup to GNSS in cases of an outage or an unreliable signal. As well, such advances have made INS more useful in the field of pedestrian navigation. This integration can provide a continuous navigation solution that works under varying conditions.

Along with the high error magnitude and noise of MEMS IMUs comes a limitation to their reliability over time. When MEMS IMUs are used with conventional Dead Reckoning (DR) methods, the readings tend to drift quickly over a short time span, yielding wrong navigational information. Methods for correction have been proposed and have been used to enhance the performance of such systems. Such correction methods include: Zero Velocity Update (ZUPT), Zero Angular Rate Update (ZARU), Magnetic Angular Rate Update (MARU), and Heuristic Drift Reduction (HDR). Unfortunately, such techniques require that certain conditions need to be met before they can be applied, and, in most cases, these conditions do not hold with handheld devices.

Pedestrian Dead Reckoning (PDR) is a special form of Dead Reckoning (DR) which exploits information about the human motion, namely the Gait Cycle (GC), to limit the drifting of the solution. PDR is composed of three main algorithms: step detection, step length estimation, and alignment, where the user location is obtained through the accumulation of steps, given a step length, and the direction of each step. Hence, step detection is a crucial component of PDR, as accurate step detection is important for tracking the user position, and any error in detecting a step directly effects the accuracy of the position tracking of the user.

It should be clear that there are a number of available existing step detection and counting systems and techniques. These systems and techniques can be categorized into two main categories: strapdown systems and handheld devices.

Strapdown Systems

Multiple approaches rely on the use of an IMU strapped down to a segment of the body. The advantage of such systems is the elimination of separate platform motion from the body, where nearly all the measurements captured by the system represent the motion of the body segment the system is connected to. Currently developed systems can be classified into: foot mounted, waist belt mounted, or wrist mounted systems. The most exhaustively tested approach for navigation purposes involves foot mounted systems.

Foot mounted systems have benefit of closely capturing the characteristics of the GC and its underlying kinetics. For example, during the stance phase it is expected that the IMU is stationary, hence is it deduced that the measurements from the IMU's accelerometer tend to gravity value while the IMU's gyroscope measurements tend to zero. Using this information, the stance phase can be easily detected. Furthermore, the accurate detection of the stance phase enables the use of correction methods to compensate for drift in the measurements. For foot mounted systems, the detection process relies on either the use of thresholds to detect the stance phase or in the use of GC state transition modelling.

Unfortunately, threshold-based detection can suffer from degraded performance especially in fast walking and running modes, where the stance phase period is diminished or eliminated. To overcome this limitation, some researches have used gait phase classifiers, where the goal is to detect all GC phases to detect the cases when the stance phase is undetected.

Wrist strapdown systems utilize the same techniques as foot-mounted systems but suffer from the disadvantage of the free motion of the arm. This disadvantage, where the arm undergoes motion that is not related to walking behavior, requires more analysis. On the other hand, wrist placement can be more beneficial for health applications due to its direct contact with the skin. Such contact can be used to sample heart rate and skin temperature along with other useful information.

It should be noted that, when threshold-based detection and state transitions are used, a predictable pattern should exist. This hypothesis holds for tethered sensors in most cases (such as in foot-mounted systems). However, in the case of a free-moving handheld device, there are no predictable outcomes and this causes researchers to resort to other methods.

Handheld Devices

In case of untethered handheld devices, there is no detectable zero velocity region for the stance phase of the GC as the human upper body half is in continuous motion unlike the foot. The device might therefore exhibit non-walking related motion due to arm motion, thereby causing orientation changes and accelerations that do not represent walking behavior. Hence, methods for step detection rely on peak extraction instead of zero acceleration periods. Regular peak detection techniques usually rely on classifiers to determine the use of the handheld devices (e.g. smartphones) to adaptively adjust step detection thresholds.

Peak detection has been exploited by many researchers. However, such techniques have their drawbacks. In many cases, classifiers are used to determine the motion type and use case of the device. A training phase is required to compute required thresholds for detection. The set of trained parameters are not global which means they might not work for other users.

As can be seen from the above, step detection and step counting is of great importance with many applications. However, while tethered approaches show high accuracy, other methods and systems which can be used with non-constrained devices such as smartphones is more desirable.

SUMMARY OF INVENTION

The present invention provides systems and methods for detecting and counting steps. Acceleration data is used to determine acceleration norms. Peaks and valleys in the resulting acceleration norms data are then detected. These peaks and valleys are indicative of steps and are validated using measurements from gyroscopes and magnetometers.

In one aspect, the present invention provides a method for detecting a step of a user from acceleration data of said user's walk, the method comprising:
 a) receiving said acceleration data including angular rates, and magnetic intensities data;
 b) determining acceleration norms from said acceleration data;
 c) detecting peaks and valleys from said acceleration norms, said peaks and valleys being localized maxima and minima when said acceleration norms are plotted;
 d) determining dominant angular rates and magnetic intensity axis of motion;
 e) detecting peaks and valleys from said dominant axis of motion, said peaks and valleys being localized maxima and minima when said dominant angular rates and magnetic intensity are plotted;
 f) determining if said peaks and valleys are valid;
 g) temporally matching of said peaks and valleys from acceleration, angular rates, and magnetic intensity for enhanced step detection;
 h) if said peaks and valleys are valid, determining that each peak and valley pair is a detected step.

In another aspect, the present invention provides computer readable media having encoded thereon computer readable and computer executable code which, when executed, implements a method for detecting a step of a user from acceleration data of said user's walk, the method comprising:
 a) receiving said acceleration data including angular rates and magnetic intensities data;
 b) determining acceleration norms from said acceleration data;
 c) detecting peaks and valleys from said acceleration norms, said peaks and valleys being localized maxima and minima when said acceleration norms are plotted;
 d) determining dominant angular rates and magnetic intensity axis of motion;
 e) detecting peaks and valleys from said dominant axis of motion, said peaks and valleys being localized maxima and minima when said dominant angular rates and magnetic intensity are plotted;
 f) determining if said peaks and valleys are valid;
 g) temporally matching of said peaks and valleys from acceleration, angular rates, and magnetic intensity for enhanced step detection;
 h) if said peaks and valleys are valid, determining that each peak and valley pair is a detected step.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Using a handheld, free-moving device, such as smartphones, for motion tracking exhibits a different motion pattern from strapdown systems that involve placing an IMU on a user's shoe or waist belt area. One of the main differences is the absence of the static period that is usually exploited in foot mounted systems for step detection. The usual pattern that is expected for handheld devices in a static pose is represented as a sequence of alternating peaks and valleys, where each peak/valley pair represents a single step.

In one aspect, the present invention provides a novel step detection method that is independent from the smartphone use case and that does not require a classifier to adaptively tune the parameters for step detection. The method is based on conclusions drawn from extensive analysis of three signals used for step detection: the acceleration norm, the angular rates vector, and the magnetic vector.

Figure 1:
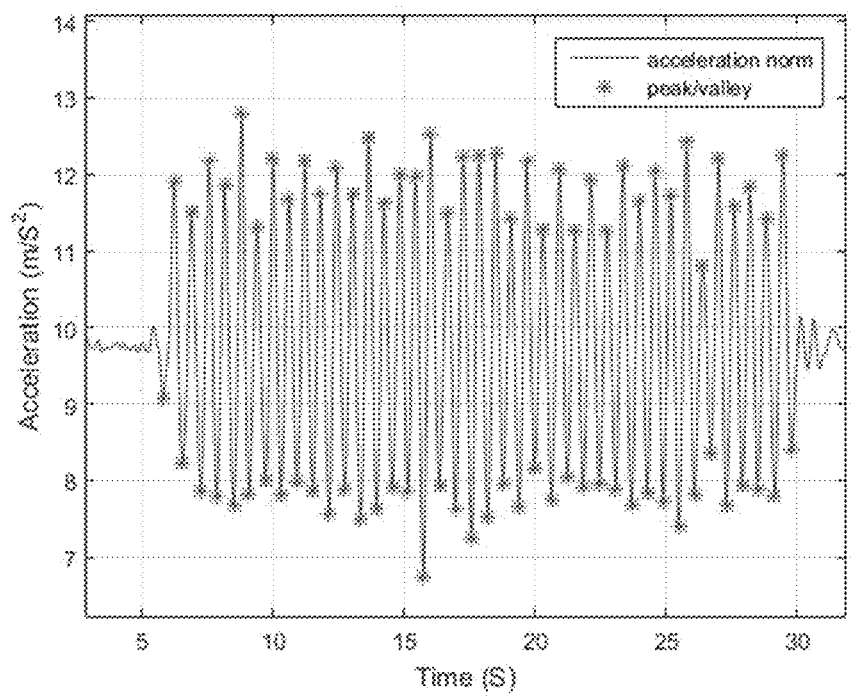
FIG. 1 is a plot of acceleration norms showing a sinusoidal pattern from data of a person walking with illustrated peaks and valleys representing steps.
Figure 2:
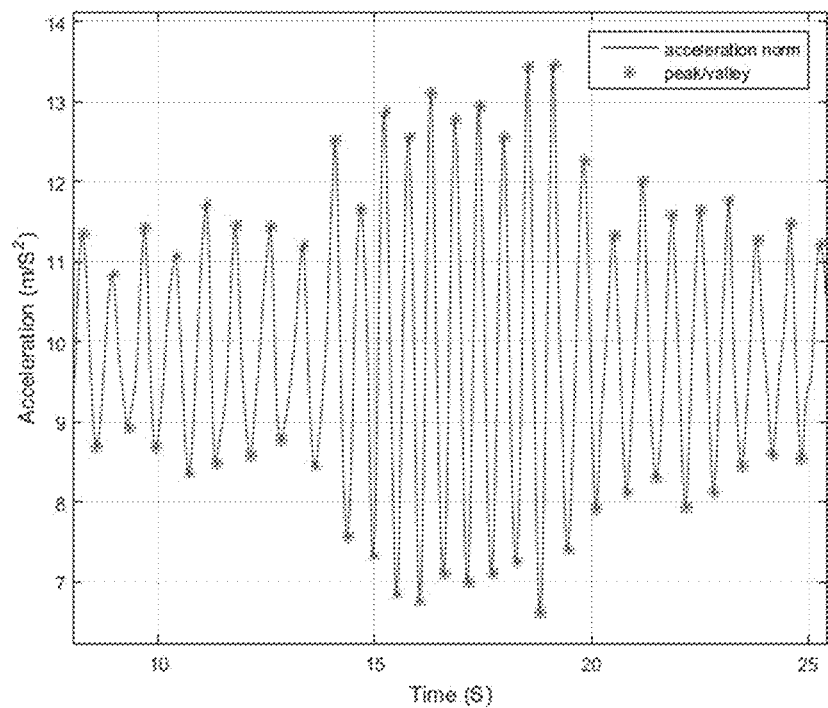
FIG. 2 is a plot of acceleration norms data for a person walking with a varying pace with illustrated peaks and valleys representing steps.
Figure 3:
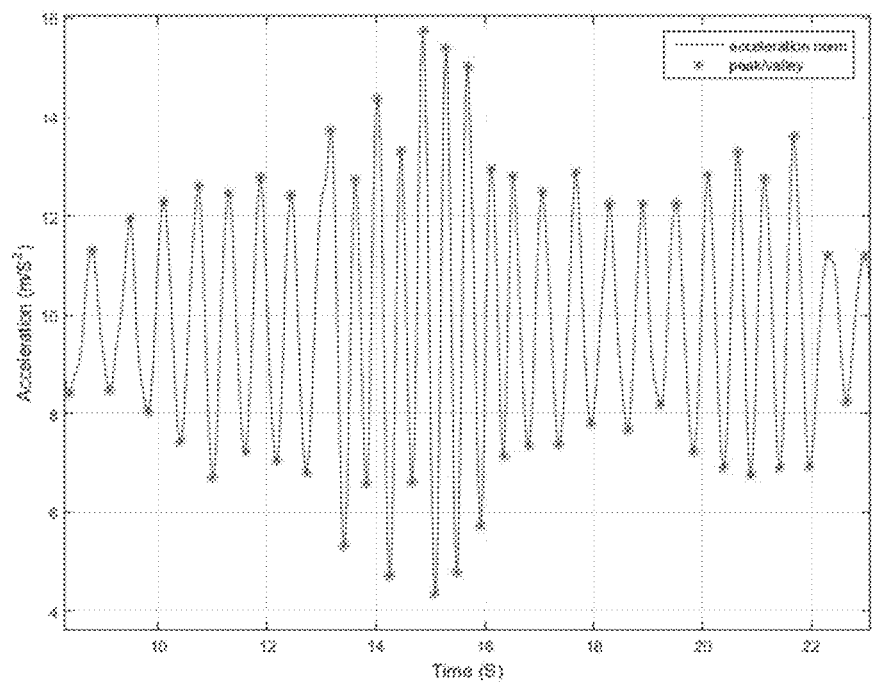
FIG. 3 illustrates a plot of acceleration norms data for a person alternating between walking and running with illustrated peaks and valleys representing steps.
Figure 4:
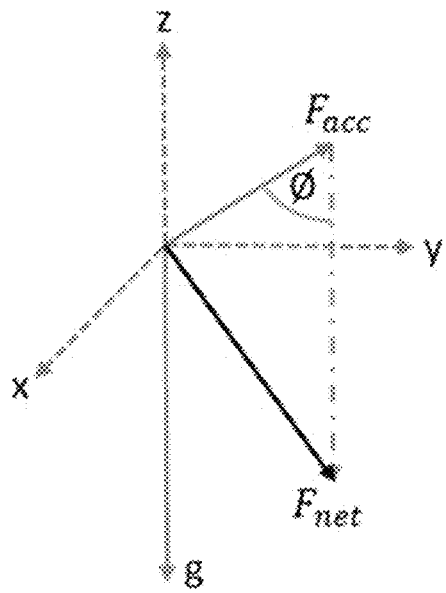
FIG. 4 illustrates forces being applied to an accelerometer as well as the equivalents of these forces.

First the acceleration norm is used without gravity compensation to avoid errors introduced from the separation process and the transformation of measurements into the Local Level Frame (LLF). From studying the norm of the accelerations in the case of a fixed device pose (i.e. compassing mode) to obtain the pattern of accelerations exerted by the walking motion, it was concluded that the acceleration norm has the following properties:

- The acceleration norm computed from equation (1) has a sinusoidal pattern where each pair of peak/valley represent a step. FIG. 1 shows an example of a regular walking pattern with peaks and valleys detected by the method according to one aspect of the invention.
- The magnitude difference between the peak/valley pair is inversely proportional to the step duration and is proportional to the motion pace. FIG. 2 and FIG. 3 show that the change in magnitude corresponds to pace variation with time.
- The use of a net force acceleration norm (uncompensated for a gravity component) as shown in FIG. 4, magnifies the pattern in the signal around the peaks and valleys while also smoothing it around the gravity shift component. This is due to the combination of linear acceleration and gravity as shown in Equation (2).
- Although in many instances it is assumed that the measured norm is the root of the sum of squares of gravity and linear acceleration, from physics the resulting force from both vectors is computed as in Equation (2). Simply subtracting the gravity value from the resultant does not yield the linear acceleration where residuals from gravity remain due to the component derived from the angle between the vectors.

It should be noted that angular rates measured by the gyroscope and the magnetic vector measured by the magnetometer are useful in the phone dangling use-case. In a phone dangling state, the user holds the phone in his hand while swinging his arms in a normal motion such as when walking holding nothing or holding something of minimal weight that does not affect his walking motion. In this case, the patterns generated also resemble a sinusoidal wave but each half of the signal represents a step.

Equations (1) and (2) are presented as:

$$a_{norm} = \sqrt[2]{a_x^2 + a_y2 + a_z^2} \tag{1}$$

$$F_{net}^2 = F_{acc}^2 + g^2 - 2*F_{acc}*g*\cos(\emptyset) \tag{2}$$

Where: $F_{net}$=net force magnitude
$F_{acc}$=linear acceleration vector norm
g=gravity norm
$\emptyset$=the angle between gravity and linear acceleration
$a_x$, $a_y$, $a_z$=accelerations in the body frame
$a_{norm}$=accelerations norm Based on the above findings, the method according to the invention applies a peak/valley pair detection for the acceleration norm, with time filtering, based on the peak-to-valley magnitude and peak-to-valley delay. Verification of peaks and valleys for cases of high device motion is also applied through further investigating the dominant axis of angular rotation and magnetic change rate, where a peak/valley extraction is also applied conditionally in the case of repetitive-high-variance patterns. The peaks and valleys of the angular velocity and magnetic field should coincide within a threshold from the peaks of the acceleration.

Figure 5:
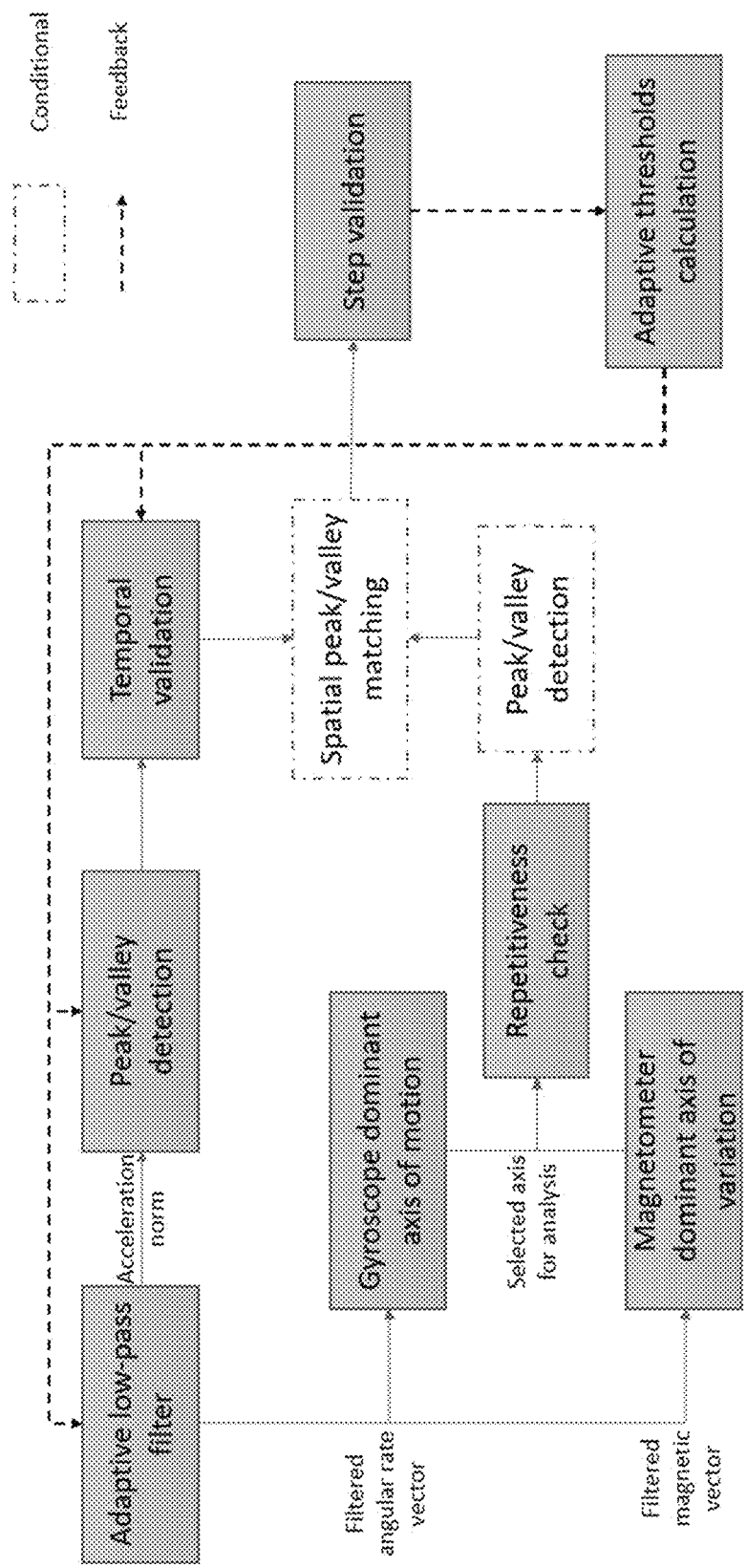
FIG. 5 is a block diagram showing the main modules/steps for a method according to one aspect of the present invention.

FIG. 5 is a block diagram detailing the main steps for the method of the invention and these steps will be discussed in greater detail below.

Adaptive Filter

Sensor signals are plagued by different errors and inaccuracies due to many factors. In the case of IMU measurements, the signals can be analyzed to compensate for deterministic errors. Because white noise and process noise can be hard to determine and model, digital filtering may be used. For a signal to be successfully filtered, the frequency of the desired signal needs to be estimated.

In one aspect of the invention, a system according to the invention uses an Infinite Impulse Response (IIR) Butterworth low pass filter for its simplicity and low computational overhead. An adaptive cut-off frequency is continuously tuned and updated based on the recently detected walking speed.

Selection of the filter order is important as it affects two main aspects of the filter: the latency and roll-off. In a Butterworth filter, the higher the order of the filter, the higher the steepness of the transition between the pass and stop bands, yielding fast roll-off and thereby making it closer to an ideal filter. However, the group delay in such a filter is increased, thereby making real-time processing unachievable. With a low order filter, the latency is low but the roll off is slower. This causes frequencies from the stop band to still exist in the filtered signal. Since real-time processing is desirable for this application, a low filter order is selected to minimize the latency. To overcome the slow roll-off of the filter, the cut-off frequency is slightly reduced to compensate for the effect of undesired frequency residuals.

Figure 6:
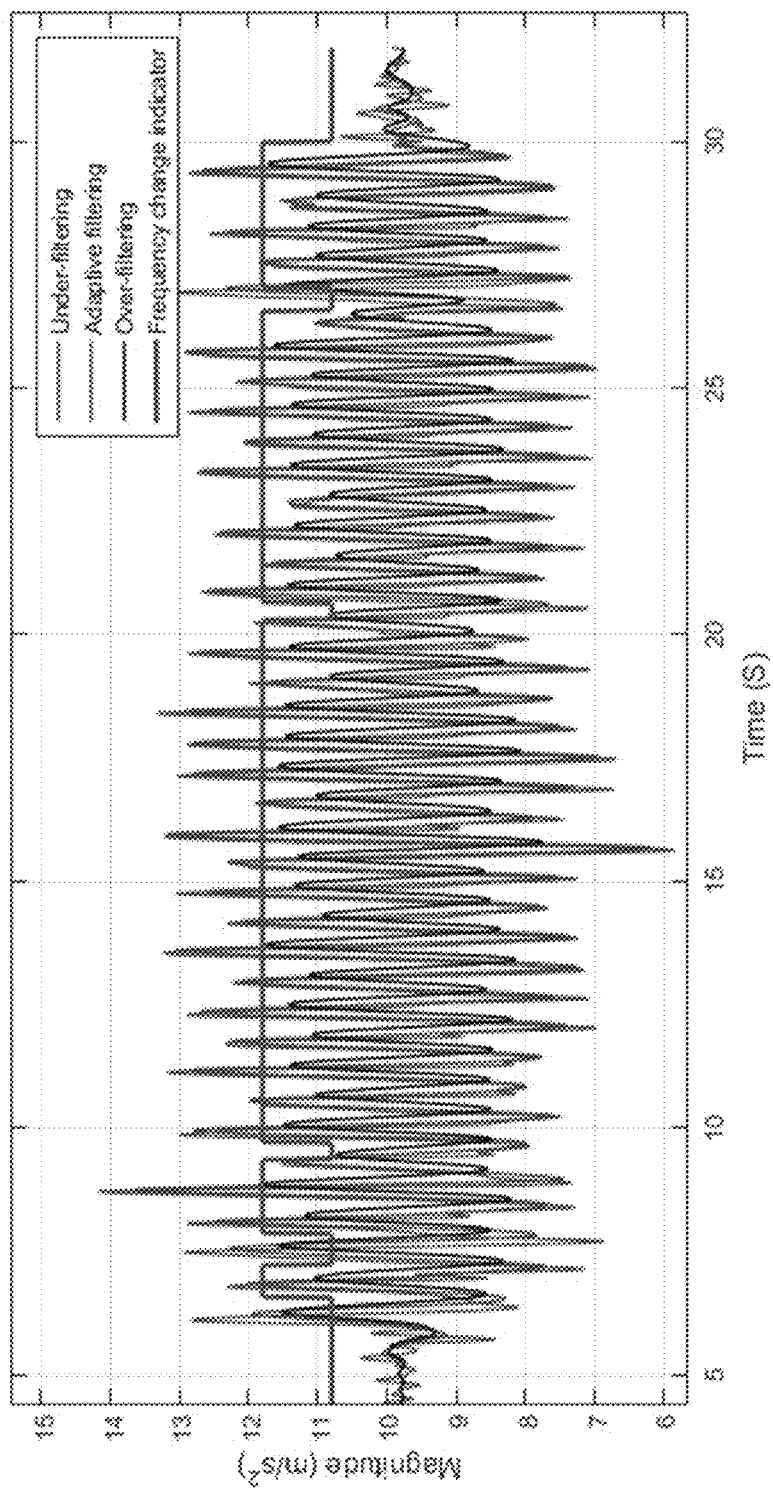
FIG. 6 is a plot of acceleration norms for a nearly constant walking speed showing a comparison between using an adaptive filter and a constant cut-off frequency.
Figure 7:
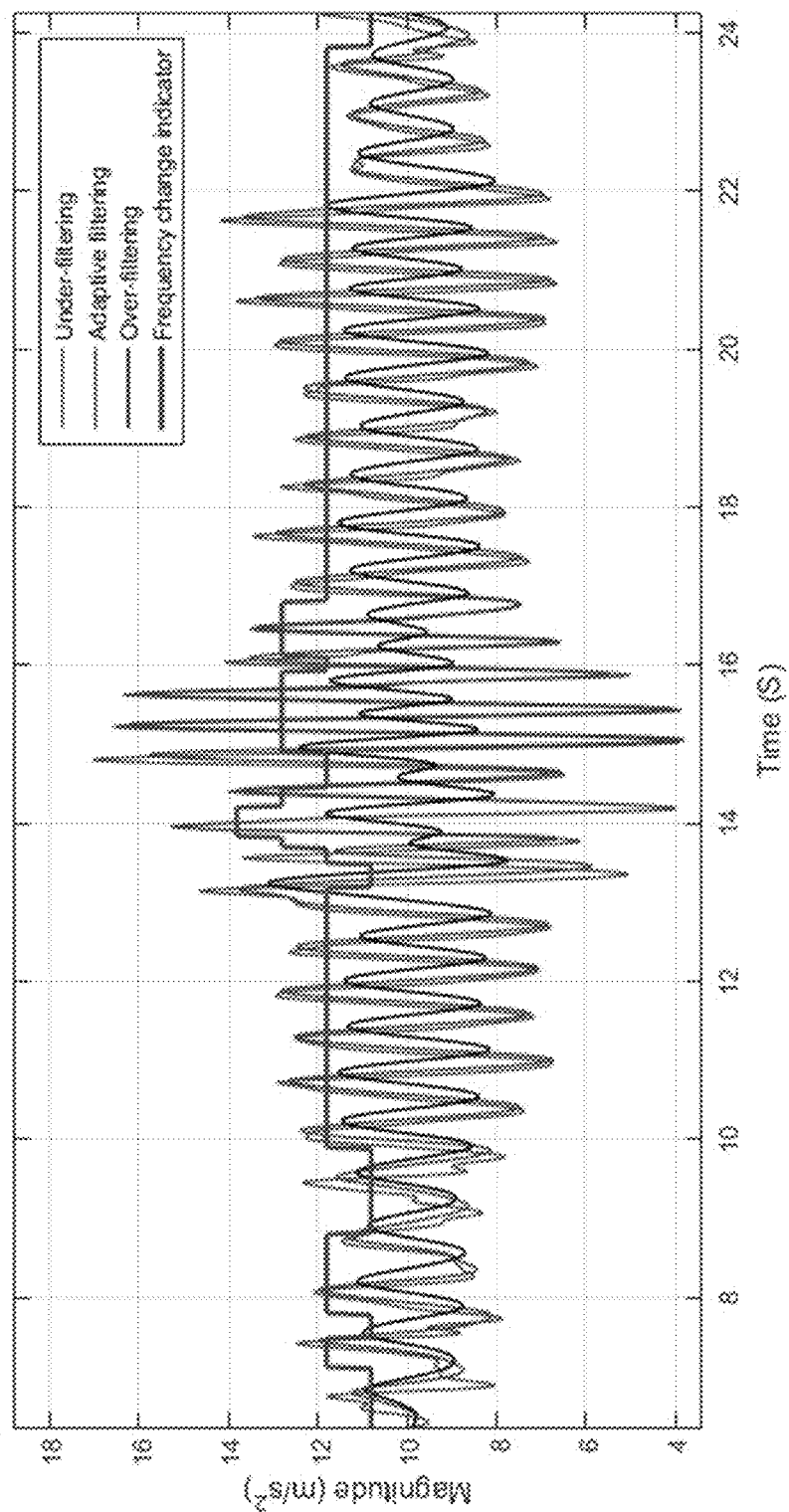
FIG. 7 is a plot of acceleration norms for a changing walking speed showing a comparison between using an adaptive filter and a constant cut-off frequency.
Figure 8:
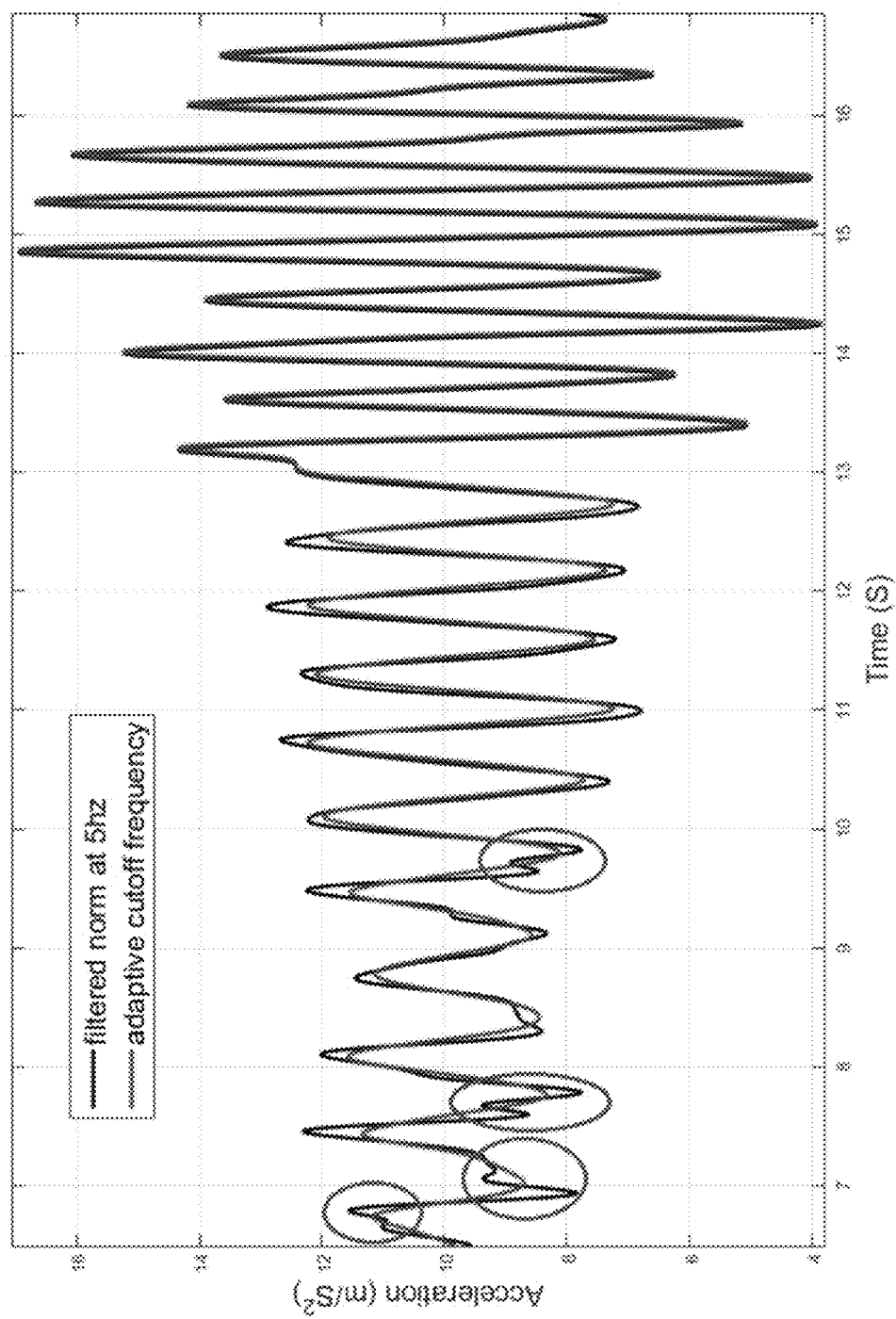
FIG. 8 illustrates a plot of acceleration norms which shows the effect of appropriately selecting a suitable cut-off frequency of a low pass filter applied to the data.

Use of a static cut-off frequency for filtering a signal with varying frequency can lead to either loss of information or leftover residual noise that affects the system. The effect of over or under estimating the cut-off frequency is shown in FIG. 6 and FIG. 7 and are compared to the case of adaptively tuning the cut-off frequency. FIG. 8 shows the specific effect of under-filtering when compared to the adaptive filter as residual fluctuations from motion noise remain in the signal.

Temporal Filtering

Due to the noise in the signal, in some cases two consecutive peaks or valleys can occur. The adaptive filter helps in reducing the chances of this happening, yet a fail-safe is needed to eliminate the undesired residual pikes. Temporal filtering works by adaptively tuning a time threshold, where a detected peak/valley can be replaced by another one of higher/lower magnitude. Occurrence of peak/valley outside the defined replacement zone is neglected unless it is an opposing type of peak with high magnitude difference from the recently detected peak.

Figure 9:
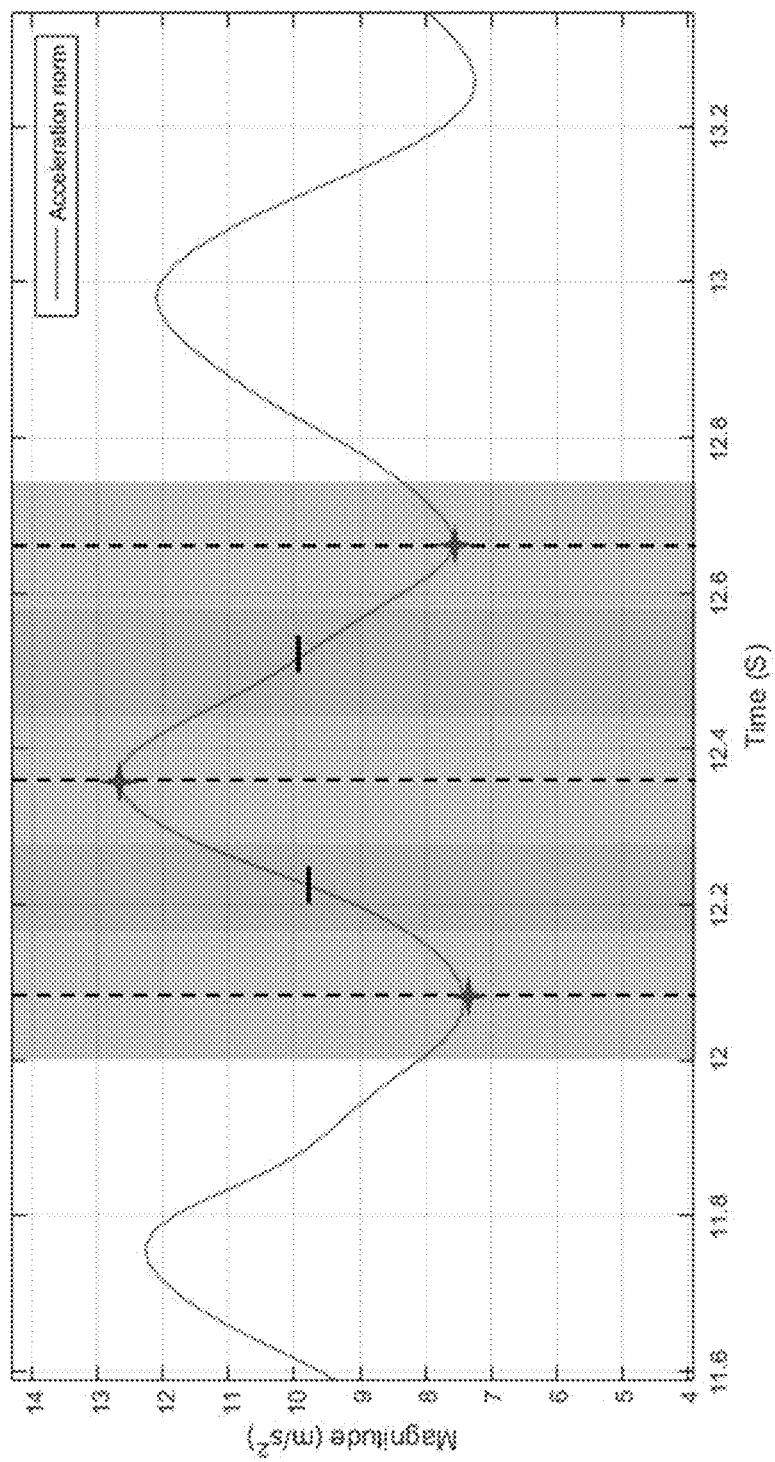
FIG. 9 shows update and rejection zones for use in peak/valley detection in a plot of acceleration norms, where blue regions are update regions and red regions are rejection regions.

Originally a peak or valley is detected if the value in the middle position of a window has the largest or the smallest value, respectively, as shown in Equation (3). Of course, the detected peak/valley is a candidate that is only verified if it is not replaced by another within a given time threshold. FIG. 9 shows the temporal threshold for update and rejection. In FIG. 9, the blue region is the update region and the red region is the rejection region. The update region is defined by a starting point that is based on a time threshold from the last detected peak/valley, indicating the starting point for searching for a peak and replacing it if conditions are met. The update region ending point is based on a time threshold starting from the first peak/valley detected within this update region.

The rejection region is the intermediate time in transition from peak to valley and vice versa where no peaks are supposed to exist in regular motion. The thresholds for defining the start and the end of the regions are adaptively tuned based on the estimated motion speed as shown in Equations (4)-(8). Equations (3)-(8) are given below.

$$\text{peak: } a_{n-1} < a_n > a_{n+1} \text{ valley: } a_{n-1} > a_n < a_{n+1} \quad (3)$$

$$\Delta t_1 = t_{(p|v)_{n-1}} - t_{(p|v)_{n-2}} \quad (4)$$

$$th_s = 0.5 * \Delta t_1 \quad (5)$$

$$th_s < \Delta t_2 = t_{(p|v)_n} - t_{(p|v)_{n-1}} \quad (6)$$

$$th_e = 0.3 * \Delta t_2 \quad (7)$$

$$t_{(p|v)_{n/r}} - t_{(p|v)_n} < th_e \quad (8)$$

Where: a=acceleration norm
$t_{(p|v)}$=time of peak or valley
$\Delta t$=time interval between peak and valley
$th_s$=time threshold for start of search/update region
$th_e$=time threshold for end of update region
$t_{(p|v)_{n/r}}$=time of replacement candidate for $n^{th}$ peak/valley.

Peak-to-Peak and Pseudo-Zero Crossing

For each detected sequence of peak/valley or valley/peak, the difference between the magnitudes reflects the speed of motion during the step, while their average represents the pseudo-zero crossing at which a step starts or ends. The difference in magnitude referred to as the peak-to-peak value is used along with the time difference between the peak and the valley to adaptively tune the cut-off frequency for the next segment of the signal.

During regular motion, when a pedestrian is speeding up or down, the change of speed does not occur instantaneously but rather increases or decreases gradually. A peak/valley magnitude difference over time represents change in walking speed, and the time difference represents a half step duration. Both can be used to tune the cut-off frequency and the time thresholds for the expected upcoming peak/valley. Equation (9) represents the magnitude at which a step is declared and the start of the next coming step. Equation (11) represents the criteria for considering a change of walking pace which leads to the application of Equation (12). Equations (9)-(12) are given as follows:

$$p_{zc} = \text{avg}(a_p, a_v) \quad (9)$$

$$\Delta a_n = a_{p_n} - a_{v_n}, \Delta a_{n-1} = a_{p_{n-1}} - a_{v_{n-1}} \quad (10)$$

$$\Delta a_n - \Delta a_{n-1} > su_{th}, \Delta a_n - \Delta a_{n-1} < sd_{th} \quad (11)$$

$$\tilde{f}_s = [F/\Delta t * 2] \quad (12)$$

Where: $p_{zc}$=pseudo zero crossing
$a_{p_n}$=$n^{th}$ peak acceleration magnitude
$a_{v_n}$=$n^{th}$ valley acceleration magnitude
$\Delta a_n$=$n^{th}$ peak/valley magnitude difference
$su_{th}$=speed up threshold
$sd_{th}$=speed down threshold=$-su_{th}$
$\tilde{f}_s$=estimated step frequency
F=sampling frequency The peak-to-peak magnitude and the pseudo-zero crossing point are also used for detecting sudden changes in motion. When a peak/valley is detected in the rejection zone, if the magnitude difference from the pseudo-zero crossing is sufficient while the peak-to-peak is of high magnitude, this indicates a sudden change in pace or a rapid change in the device motion separately from the user. In this case, although the peak/valley is in the rejection region, it will be accepted as a candidate.

Gyroscope Fusion

In some use-cases, the angular rates generated have a dominant repetitive pattern in one of the gyroscope axes. The signal pattern is similar to the acceleration norm but at half of its frequency. The acceleration norm represents the full motion of the platform (in this case the pedestrian) and hence captures the patterns from both right and left legs. For the gyroscope, if the gyroscope is placed in a torso shirt pocket, it will capture the sway motion of the torso. However, if the gyroscope is placed in a pants pocket, whether a side pocket or a rear pocket, the gyroscope will sense the motion of the leg it is appended to. In both cases the generated signal is repetitive of a full stride, which is equivalent to two steps. If the phone is held in a user's hand, under regular motion conditions the arm swings forward when the opposing leg is moving forward and swings backwards when the other leg moves forward. This is then repeated and, as such, the arm motion is represented by two steps, one from each foot. In all of the above cases, the generated signal has a frequency that is half that of the acceleration.

To incorporate the use of the gyroscope with the present invention, this is accomplished as follows: first, a dominant axis of rotational motion is determined using the variance of the signal. Then, a periodicity check is applied. If a periodic signal is found, this signal is used for step detection along with the acceleration, where, for each peak or valley detected in the gyroscope signal, there should exist a corresponding peak in the acceleration norm. If high angular rates exist but no periodicity is found, this is an indication that the device is undergoing irregular motion that does not match walking behavior. In such a case, the gyroscope measurements are neglected and are not used for step detection.

Figure 10:
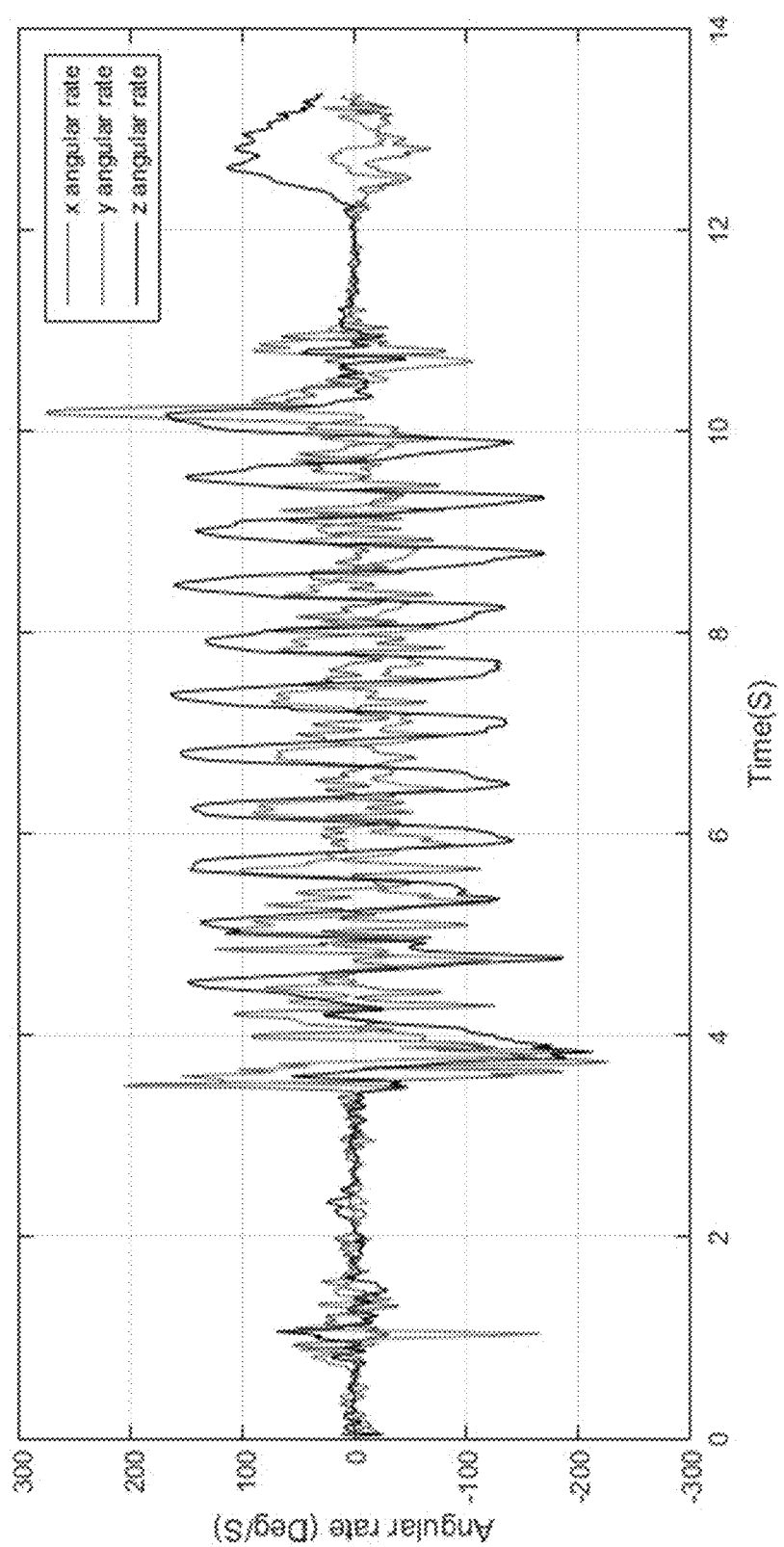
FIG. 10 illustrates gyroscope measurements for the phone dangling case.
Figure 11:
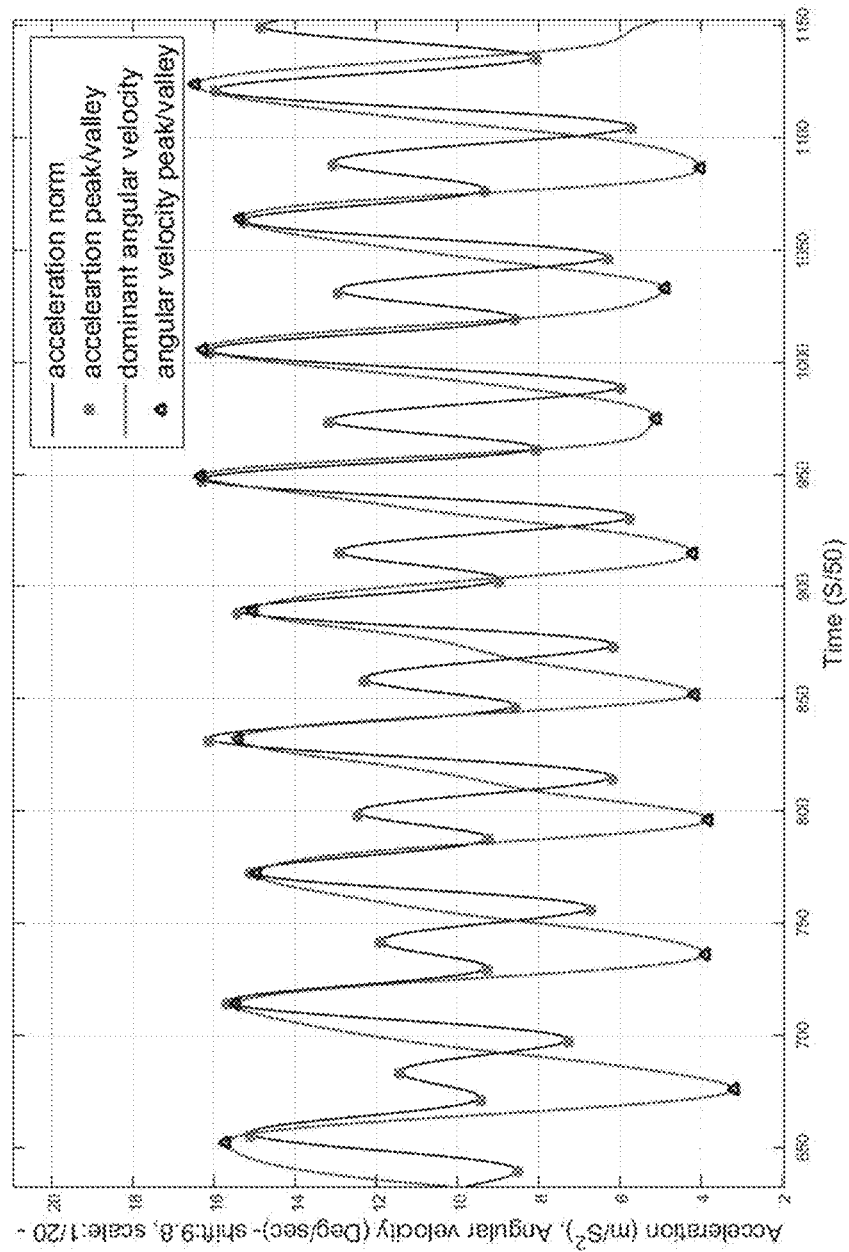
FIG. 11 shows peak matching between an acceleration norm plot and a dominant angular rate plot.

When the desired conditions exist, a peak detection step is applied to the dominant axis of motion in the gyroscope measurements. In these measurements, for each detected peak and valley in the gyroscope measurements, there are two corresponding peaks in the acceleration norm with a valley in between. The peak matching process utilizes a time window threshold for verifying the validity of the peak. FIG. 10 shows the angular rates of a regular swinging motion while walking. From FIG. 10, it can be seen that z-axis measurements are periodic with distinguishable peaks and valleys. The matching process is shown in FIG. 11 where, for each peak in the acceleration norm, there exists a peak/valley match in the extracted dominant angular rate signal.

Magnetometer Fusion

The surrounding magnetic field sensed by the magnetometer over a given period is supposed to be constant if no interference occurs. The magnetic vector has been previously used for heading estimation and for positioning using magnetic map matching. It should be clear that the magnetic vector sensed by the magnetometer can be used for step detection.

Since the magnetic field does not abruptly change within a step, any changes in the magnetic intensity measurements by the magnetometer represent a change in the orientation of the device with respect to the surrounding magnetic field.

In the case of a phone that is being dangled by a user, the orientation of the magnetometer axes change with respect to the surrounding magnetic field, resulting in a periodic signal in one or more axes of the magnetometer. This signal is similar to that generated in the gyroscope measurements and have the same properties where the frequency of the signals is half that of the walking acceleration norm. For this approach to be beneficial for step detection, the rate of the magnetic changes induced by the change of the device pose must be of a higher order than the interference from surrounding sources.

Figure 12:
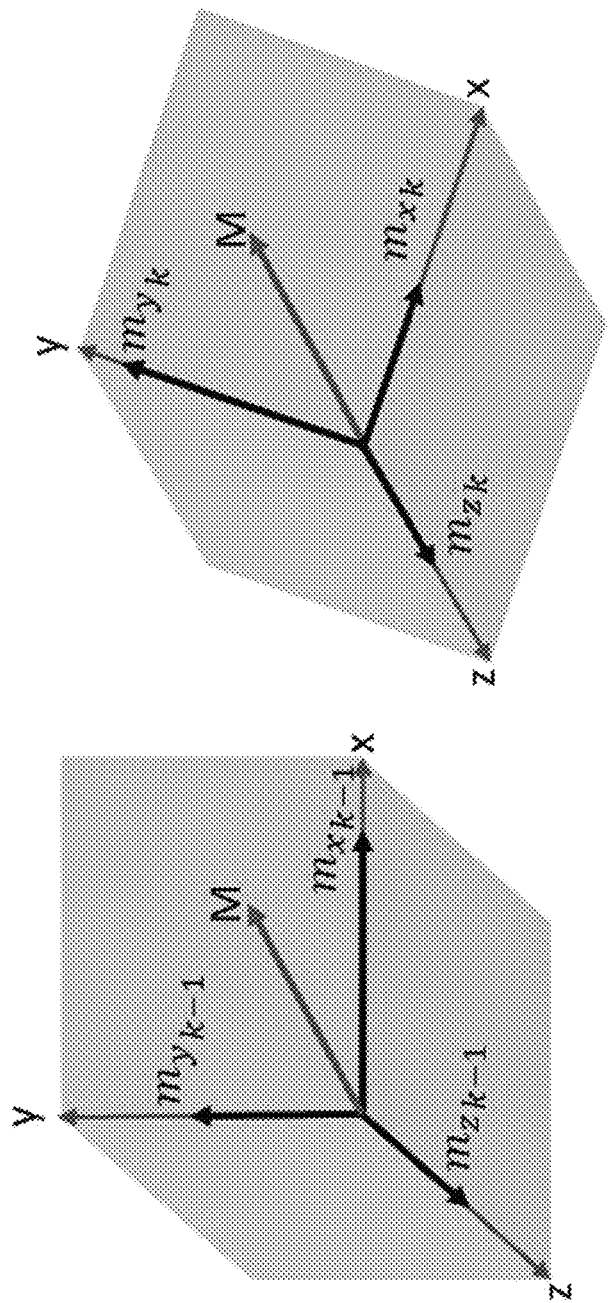
FIG. 12 shows magnetometer orientation change for a constant magnetic field along with the corresponding components change.
Figure 13:
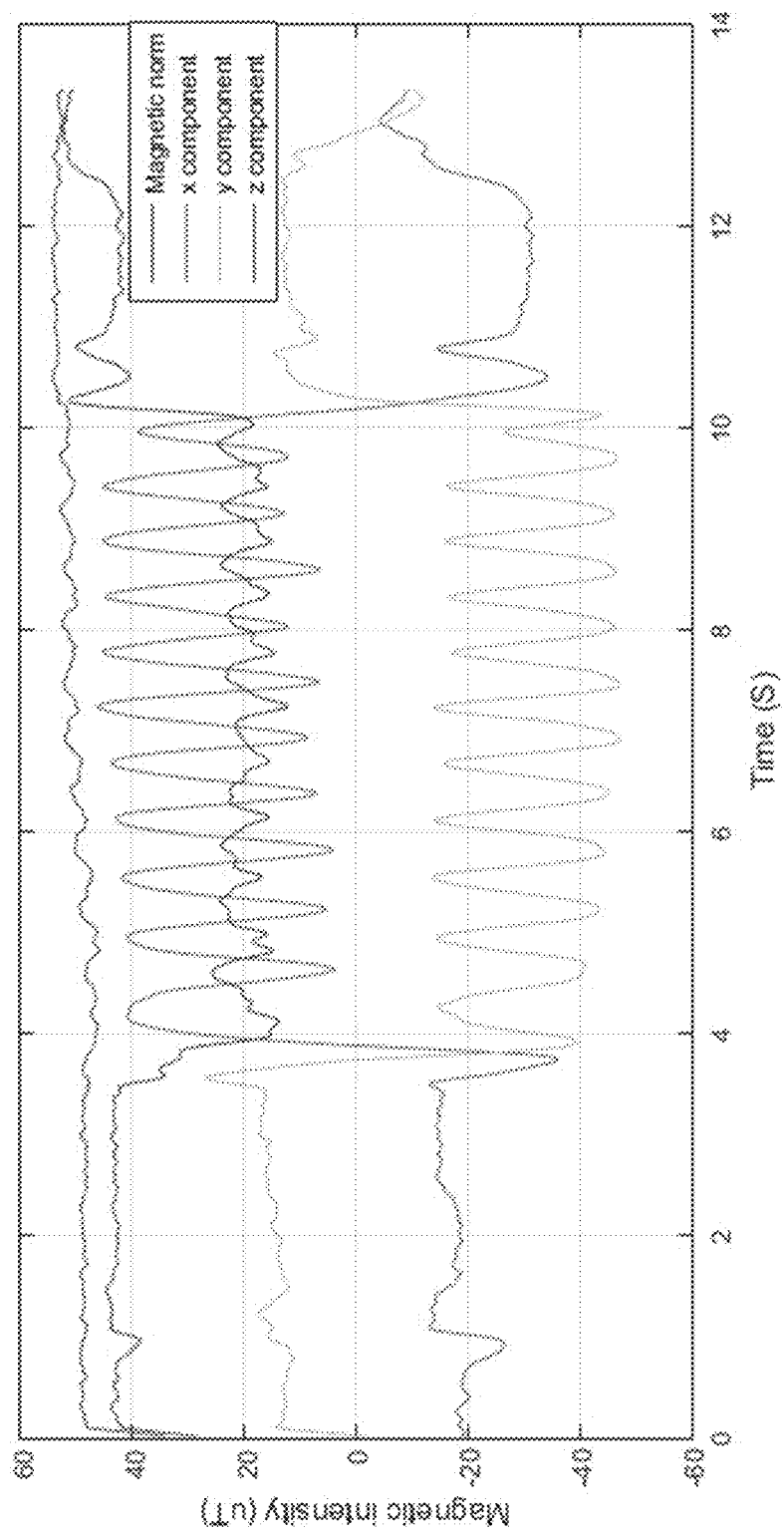
FIG. 13 illustrates a plot of magnetic intensity components during swinging.
Figure 14:
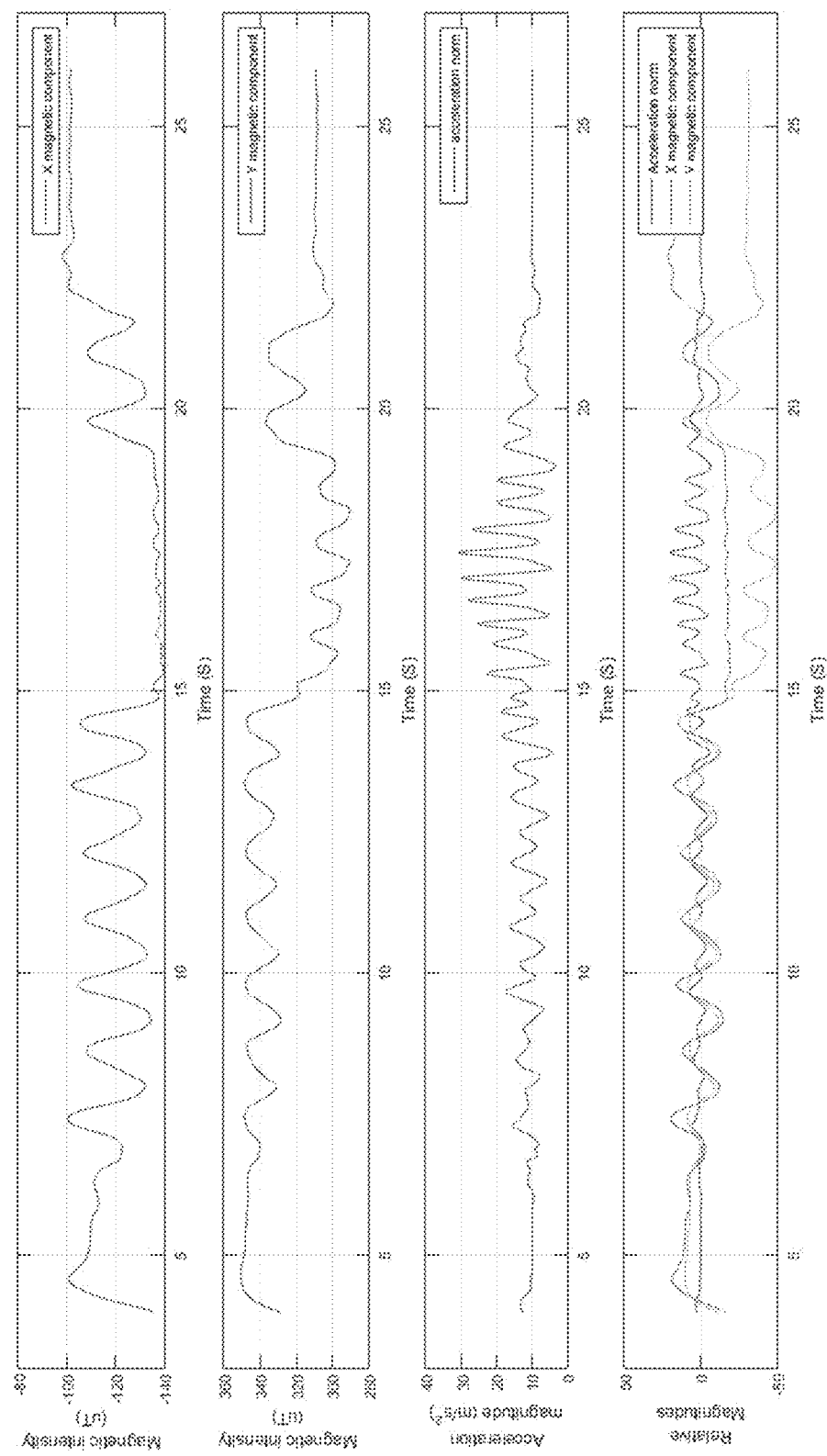
FIG. 14 are plots showing acceleration norm and corresponding magnetic intensities for a phone swinging case.

As illustrated in FIG. 12, the magnetic field norm is computed based on equation (13). As the magnetic field remains nearly constant (based on equation (14)), the changes in measured components are due to changes in the orientation of the sensor frame with respect to the vector as shown in equation (15). Each of the axes of the sensor measure a component from the magnetic field vector depending on the non-coplanar angle between the vector and the axis based on the cosine rule. As the frame orientation changes during the user's motion, the component will vary in a repetitive form. Equations (13)-(15) are provided as follows:

$$M_k = \sqrt[2]{m_x^2 + m_y^2 + m_z^2} \tag{13}$$

$$M_{k-1} \cong M_k \tag{14}$$

$$m_{x_k} = M_k \cos(\theta_{x_k}) \tag{15}$$
$$m_{y_k} = M_k \cos(\theta_{y_k})$$
$$m_{z_k} = M_k \cos(\theta_{z_k})$$

Figure 15:
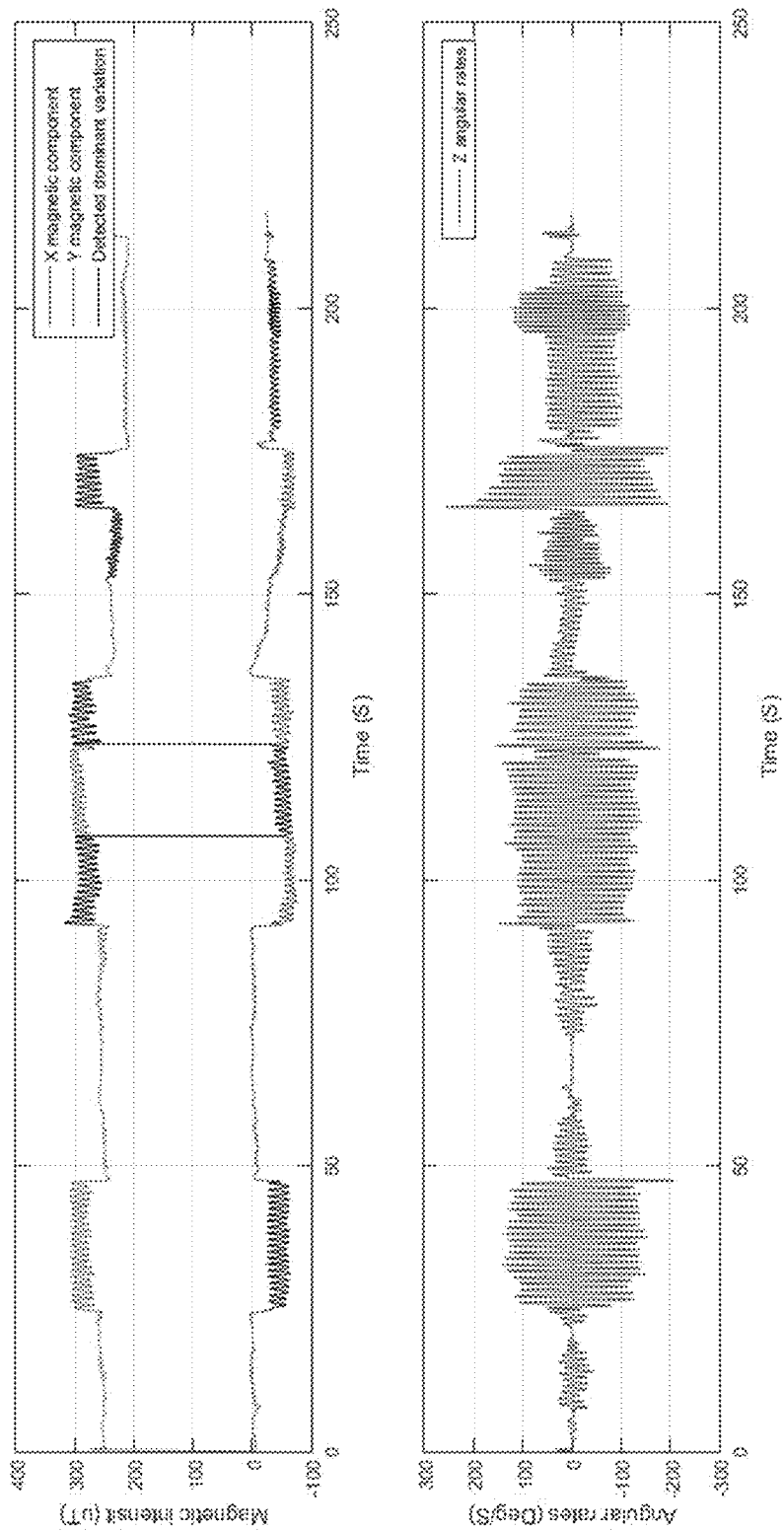
FIG. 15 is an illustration of the extraction of dominant axis of magnetic intensity variation and angular rates variation.

Where:

$\theta_{x_k}, \theta_{y_k}, \theta_{z_k}$=Angles from the vector to each of the body frame axes at time K $m_x, m_y, m_z$=Magnetic intensities in the body frame $M_K$=Magnetic norm at time K Similar to the case of angular rates, a dominant axis of magnetic intensity variation needs to be distinguished. Upon the extraction of the dominant-axis of variation, the magnetic intensity component is tested for periodicity and repetitiveness to be fused with accelerations and angular rates for step detection. An example of successful dominant-axis of magnetic intensity variation and dominant-axis of angular rate motion extraction is shown in FIG. 15. In FIG. 15, it can be seen that the present invention is able to detect the dominant-axis of motion and variation in both the magnetometer and gyroscope data. These signals are then analyzed for peak/valley extraction to further enhance the step detection.

The peak matching for the magnetometer detected peaks follows the same rules as those for the angular rates. For clarity, a magnetic peak should fall in the same window as that of peaks in the acceleration norm and in in the angular rates. This peak matching is used to indicate magnetic perturbations. If an angular rate peak is found while the magnetic changes are high but there is no corresponding (or coinciding) peak, then these magnetic changes are recognized as magnetic interference.

Step Validation

A step validation method is used to verify if the detected sequence is an actual step or a mimicking behaviour. It should be clear that, in some use-cases, smartphone acceleration signals with sequences of peak/valley pairs can be induced even when the device is not in motion. The step validation for one aspect of the invention involves a simple double integration of the acceleration signals after the removal of the gravity vector to obtain the corresponding displacement for the detected pattern. After this, this displacement is compared to a significant motion threshold that is adaptively tuned based on the user's previous steps. If this displacement is found to be greater than the threshold, the step is valid and is counted. On the other hand, if this displacement is less than the threshold, the step candidate is considered as a false positive and removed. Equations (16)-(18) represent the displacement of the current step, the step threshold computation, and the condition for accepting a step as being valid. The step displacement is the double integration of the linear acceleration within the detected step period denoted by start (s) and end (e). The step threshold is computed as 0.6 of the average of the previous k steps (in one implementation, this is set to 3) to adapt to changes in the speed of motion.

$$d_n = \int \int_s^e la_{norm} \tag{16}$$

$$th_s = \frac{0.6}{k} \sum_{i=1}^{k} d_{n-1} \tag{17}$$

$$d_n > th_s \tag{18}$$

Where: $d_n$=$n^{th}$ step displacement $la_{norm}$=linear acceleration norm $th_s$=step displacement threshold The step detection and step counting technique of one aspect of the present invention applies a sequence of sub-routines to detect the steps taken by a user and verify these steps. The method involves a real-time processing of the sensor data with only one epoch delay for detecting the peaks and valleys in the signal. Table 1 below details the notations of the variables used in the method and in the subroutines. Subroutines 1-6 (shown in pseudo-code below) illustrate the logic for the main modules of a software package that implements this aspect of the present invention. In addition, routine 7 details the main operation framework of a system according to another aspect of the invention.

TABLE 1

List of variable notations used in the method and the subroutines

| Notations | |
|---|---|
| $a_n$ | Acceleration magnitude at time n |
| $A_{s_k}$ | Accelerations during $K_{th}$ detected step |
| $a_{peak_k}$ | $K_{th}$ peak magnitude |
| $a_{valley_k}$ | $K_{th}$ valley magnitude |
| LPD | Last peak/valley pair difference |
| F | Sampling frequency |
| Fi | Frequency index for selecting filter coefficients, where |

TABLE 1-continued

List of variable notations used in the method and the subroutines
Notations

|  |  |
|---|---|
|  | 5 is the max index |
| $f_\omega$ | Estimated angular rates frequency |
| $f_m$ | Estimated magnetic intensity frequency |
| $f_a$ | Estimated acceleration frequency |
| S | Peak detection state: 1 for peak, −1 for valley, and 0 for intermediate point |
| ω(n) | A window of size n of angular rates vector |
| m(n) | A window of size n of magnetic intensity vector |
| $\sigma_{\omega k}$ | Variance for angular rates of axis k |
| $\sigma_{mk}$ | Variance for magnetic intensities of axis k |
| dr | Dominance rank |
| $t_{a_{peak}}$ | Time of latest acceleration peak |
| $t_{a_{valley}}$ | Time of latest acceleration valley |
| $t_{\omega_{peak}}$ | Time of latest angular rate peak/valley |
| $t_{m_{peak}}$ | Time of latest magnetic intensity peak/valley |
| $t_{th_{peak}}$ | Time threshold for peak matching |
| $t_{a/r}$ | Time threshold for end of rejection zone and beginning of candidate detection |
| $th_u$ | Time threshold for updating acceleration peak/valley |
| $th_s$ | Significant displacement threshold for step validation |

The subroutines used in one software implementation of the present invention are detailed in pseudo-code below.

---

Subroutine 1: Detect candidate (window of last three accelerations)

If $|a_{n-1}| > |a_{n-2}|$ && $|a_n|$
    Return (S= 1)
Elseif $|a_{n-1}| < |a_{n-2}|$ && $|a_n|$
    Return (S= −1)
Else
    Return (S= 0)

---

Subroutine 2: Peak update ($th_u$, $S_{k-1}$, $S_k$)

If $S_{n\_1} == S_n$
    If $S_n = 1$ && $\left(t_{a_{peak_k}} - t_{a_{peak_{k-1}}} < th_u\right)$ && $a_{peak_k} > a_{peak_{k-1}}$ Return(update-peak)

Elseif $S_n = -1$ && $\left(t_{a_{valley_k}} - t_{a_{valley_{k-1}}} < th_u\right)$ && $a_{valley_k} < a_{valley_{k-1}}$ Return(update-valley)
Else
    Return(no-update)

---

Subroutine 3: Adaptive filter frequency selector (LPD)

If previous state is static
    Return (Fi =1)
Else
    Return (minimum (Fi= ceil(F/(LPD*2)),6))

---

Subroutine 4: Dominant axis extraction(ω(n), m(n))

Compute $\sigma_{\omega x}(n), \sigma_{\omega y}(n), \sigma_{\omega z}(n), \sigma_{mx}(n), \sigma_{my}(n), \sigma_{mz}(n)$
For each axis
    If signal is periodic
        For all axes of gyro and mag
            $dr_{axis\omega} = \sigma_{axis_\omega}/12 \times |f_{\omega_{axis}} - f_a|$
            $dr_{axis m} = \sigma_{axis_m}/12 \times |f_{m_{axis}} - f_a|$

---

Subroutine 4: Dominant axis extraction(ω(n), m(n))

Else
        dr = 0
Return (max (dr$_\omega$), max (dr$_m$))

---

Subroutine 5: Peak matching( $t_{a_{peak}}$, $t_{\omega_{peak}}$, $t_{m_{peak}}$)

If $t_{\omega_{peak}} - t_{m_{peak}} < t_{th_{peak}}$
    Return(matching)
Elseif $t_{a_{peak}} - t_{\omega_{peak}} < t_{th_{peak}}$ || $t_{a_{peak}} - t_{m_{peak}} < t_{th_{peak}}$
    Return(matching)
Else
    Return(none-matching)

---

Subroutine 6: Step validation ($A_{S_k}$)

$d = \iint A_{S_k}$ for detected step displacement
If $d > th_s$
    Return(valid)
Else
    Return(invalid)

---

Routine/Method 7: Step detection framework

Initiate adaptive filter frequencies and coefficients
Repeat for each sample:
------- peak extraction and update section -------
If in motion
    Filter measurements
    S ← Detect candidate
    If S=1
        If $S_{k-1}$= −1 && time_since_valley>$t_{a/r}$
            Valid peak detected
        Elseif $S_{k-1}$= S
            $\Delta t = t_{S_K} - t_{S_{K-1}}$
            $a_{peak_k}$ = peak update ($th_u$, $S_{k-1}$, $S_k$)
            If $\Delta t \approx$ step duration && significant motion detected
                Account for valley miss
            Endif
        Endif
    Elseif S= −1
        If $S_{k-1}$= 1 && time_since_peak>$t_{a/r}$
            Valid valley detected
        Elseif $S_{k-1}$= S
            $\Delta t = t_{S_K} - t_{S_{K-1}}$
            $a_{valley_k}$ = peak update ($th_u$, $S_{k-1}$, $S_k$)
            If $\Delta t \approx$ step duration && significant motion detected
                Account for peak miss
            Endif
        Endif
    Endif
------- peak validation from gyroscope and magnetometer -------
    dominant axis extraction(ω(n), m(n))
    If dr>0
        $S_\omega$, $S_m$ ← Detect candidate(ω(n), m(n))
        If $S_\omega$=1 || $S_\omega$= −1
            peak matching( $t_{a_{peak}}$, $t_{\omega_{peak}}$, $t_{m_{peak}}$)
            validate matching peaks
        Endif
    Endif
------- step validation -------
    step validation ($A_{S_k}$)
    adaptive filter frequency selector (LPD)

It should be clear that Subroutine 1 returns a 1 if, for a window of 3 successive acceleration norm data points, the middle data point is greater than the other two data points (i.e. there is a peak in the middle of the 3 data points). A −1 is returned if the middle data point is lesser than the other two data points (i.e. there is a valley in the middle of the three data points). If neither of these possibilities are encountered, a 0 is returned.

For Subroutine 2, if two successive peaks are detected and they are both within a threshold time window and the latest peak is higher than the previous peak, then an update on the peak is performed. Similarly, if two successive valleys are detected with both being in the threshold time window and newest valley is lower than the previous valley, then a valley update is performed.

For Subroutine 3, filter coefficients are selected based on the sampling frequency. If the previous state is static, then the first set of coefficients are used (i.e. Fi=1). However, subsequent frequency coefficients will be based on the sampling frequency and the difference between last peak/valley measurements.

Subroutine 4 determines the dominant axis for both the gyroscope and the magnetometer while Subroutine 5 checks if a peak in the acceleration norms has a corresponding peak in either the magnetometer readings or the gyroscope readings. Similarly, Subroutine 5 checks if a peak in the magnetometer readings has a corresponding peak in the gyroscope readings. Subroutine 5 does this by checking if a peak from one sensor is within a specific time window of another peak from another sensor.

Subroutine 6 validates a potential step by performing a double integral on the accelerations for the potential step. If the result is greater than a distance threshold for a step, then the step is valid.

Routine 7 is the overarching framework that calls the various subroutines to implement this aspect of the invention. This routine assumes that acceleration norms have been received and, for each potential step candidate, valid peaks or valid valleys are detected. Peaks in the magnetometer and gyroscope measurements are then matched. Finally, the potential step detected is validated.

Figure 16:
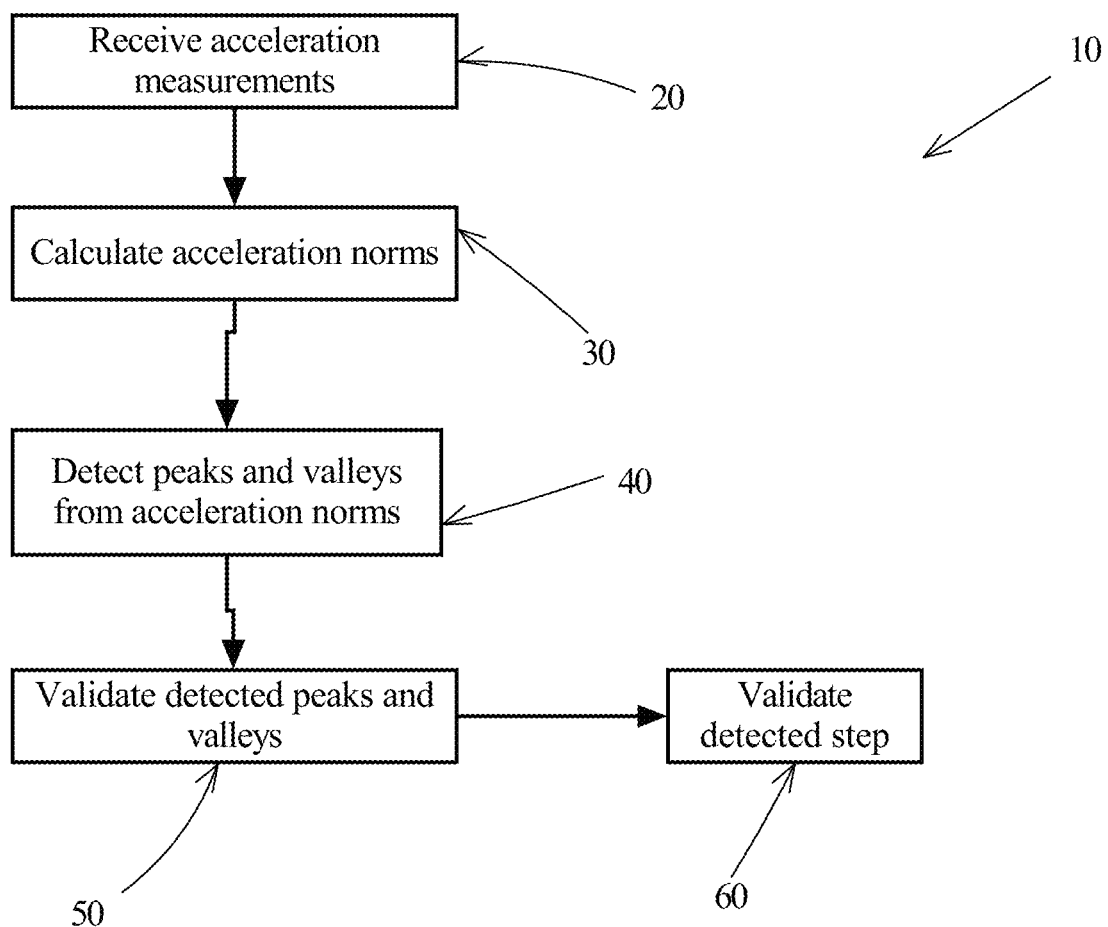
FIG. 16 is a flowchart detailing steps in a method according to one aspect of the present invention.

Referring to FIG. 16, a flowchart detailing the steps in a method 10 according to one aspect of the invention is illustrated. In this method, the initial step 20 is that of receiving acceleration measurements. From these measurements, acceleration norms are calculated (step 30) per Equation (1). The resulting acceleration norms are then processed to detect peaks and valleys (step 40) with each peak and valley pair being a possible step. The peaks detected are then validated using measurements from the gyroscope and the magnetometer (step 50). Once the peaks have been validated, the actual step is validated (step 60).

Of course, once a step has been validated, this detected and validated step can then be used in any number of ways. As an example, in a PDR navigation system, when a step is detected, the step length and orientation is estimated and used to localize the user and to provide a continuous position tracking and navigation solution. It should, however, be clear that the method in FIG. 16 may also involve continuous adaptive filtering of frequencies and temporal filtering of measurements. Similarly, the method may involve the above noted matching of peaks between acceleration norms, magnetometer measurements, and gyroscope measurements.

In terms of implementation, software implementing the method may be installed on devices equipped with IMUs, and magnetometers and which are capable of the real-time data processing preferred for the method. The method has been tested using smartphones, namely the HTC m9 and the Apple iPhone 6. Other similar devices may, of course, be used. As well, it should be clear that devices with other configurations may also be used. Note, however, that the method may also be used with data sets that include acceleration data and gyroscopic and/or magnetometer measurements. While it is preferred that the processing of the data be performed in real-time or in near real-time, delayed processing (i.e. non-real-time) may also yield useful results.

For testing the algorithm, data sets where collected by two smartphones, namely the HTC one m9 and the Apple iPhone6. The test scenarios that were carried out are combinations of phone use cases with motion modes. These use cases were: Compassing, Dangling, texting, phoning, side pocket placement, and free-moving. It should be clear that the free-moving case is a combination of the all previous use cases. The motion modes used are: slow walking, regular pace walking, running, and, finally, a combination of all the motion modes. Multiple data sets were collected for each combination of use case and motion mode by 20 different test subjects, each test being carried out by each of the test subjects was comprised of 200 steps. The summary of the data sets description is found in Table 2

TABLE 2

Collected data set description
Datasets

| Device pose | Step mode | | | |
|---|---|---|---|---|
| | Walking regular pace | Slow walking | Running | Combined |
| Compassing | 20 | 20 | 20 | 20 |
| | (200 steps) | (200 steps) | (200 steps) | (200 steps) |
| Dangling | 20 | 20 | 20 | 20 |
| | (200 steps) | (200 steps) | (200 steps) | (200 steps) |
| Texting | 20 | 20 | 20 | 20 |
| | (200 steps) | (200 steps) | (200 steps) | (200 steps) |
| Phoning | 20 | 20 | 20 | 20 |
| | (200 steps) | (200 steps) | (200 steps) | (200 steps) |
| Pocket | 20 | 20 | 20 | 20 |
| | (200 steps) | (200 steps) | (200 steps) | (200 steps) |
| Free-motion | 20 | 20 | 20 | 20 |
| | (200 steps) | (200 steps) | (200 steps) | (200 steps) |

Table 3 shows the average detection success of one aspect of the present invention for each combination of step mode and device pose carried out by the test subjects. The walking pace for the regular walking ranged between 1.5 and 2.3 steps, the slow walking between 0.7 and 1.3, and the running between 2.5 and 4 steps. As seen the lowest performance recorder for step modes was in the slow walking case, this occurs because the motion noise becomes more dominant in slow step modes, like hand shaking and imbalance in motion. As the speed of motion increases, the motion noise ratio to the motion signal itself becomes less and gets filtered out easily. The effect of the motion noise was highest when in texting mode, which was caused by the patterns generated from the tapping on the screen being dominant and causing many fake peaks. The best reported performances where in the case of regular walking with compassing, pocket and phoning, which was due to the relative static pose of the phone which made the motion signal dominant in comparison to the device motion.

TABLE 3

Average accuracy of the proposed algorithm for the data sets collected Detection accuracy

| Device pose | Step mode | | | |
|---|---|---|---|---|
| | Walking regular pace | Slow walking | Running | Combined |
| Compassing | 100% | 99.85% | 99.9% | 99.9% |
| Dangling | 99.85% | 99.65% | 99.85% | 99.8% |
| Texting | 99.9% | 99.00% | 99.9% | 99.65% |
| Phoning | 99.95% | 99.85% | 99.95% | 99.9% |
| Pocket | 100% | 99.85% | 99.95% | 99.95% |
| Free-motion | 99.8% | 99.4% | 99.75% | 99.6% |

Another data set was collected where the test subject used two wrist fitness bands for step counting to be compared in performance to the proposed invention. The data set collected was a combination of the free-moving use case with varying walking speeds and alternating walking and running. The wrist bands used were the Fitbit Flex2 and the Xiaomi Mi Band 2. The bands were mounted on the right wrist while the smartphone was held also in the right hand and hence all the devices are nearly experiencing the same signals except for the case when the phone was placed in the pocket. Results shown in Table 4 indicate a higher performance by the invention in comparison to the two fitness bands used. A minimum accuracy of 99.38% and a maximum of 99.66% are reported with an average of 99.47%. In all tests the algorithm using the smartphone outperformed the accuracy of both bands.

TABLE 4

Performance evaluation in comparison to Flex2 and MiBand2

| Test | Performance | | |
|---|---|---|---|
| | Proposed | Flex2 | MiBand2 |
| Test 1 (383 steps) | 381 - 99.47% | 378 - 98.69% | 376 - 97.66% |
| Test 2 (411 steps) | 409 - 99.51% | 405 - 98.54% | 407 - 99.02% |
| Test 3 (433 steps) | 430 - 99.31% | 426 - 98.38% | 425 - 98.15% |
| Test 4 (485 steps) | 482 - 99.38% | 475 - 97.93% | 473 - 97.52% |
| Test 5 (530 steps) | 527 - 99.43% | 522 - 98.49% | 520 - 98.11% |
| Test 6 (594 steps) | 592 - 99.66% | 582 - 97.97% | 579 - 97.47% |
| Overall (2836) | 2821 - 99.47% | 2788 - 98.31% | 2780 - 98.02% |

In tests, the methods and variants of the present invention showed high versatility. In these tests, the method showed an average maximum accuracy of 100% in some cases using fixed device pose and a minimum of 99.1% in the case of slow walking while texting. It should be noted that the lower value was perhaps due to screen tapping induced noise caused by the texting. The testing showed that the method had an average accuracy of 99.6% for combined step modes with low dynamic phone pose over time and an accuracy of 99.47% for high dynamic changes. The various implementations of the present invention outperformed the accuracy of two of fitness bands available in the market—FitBit2 and MiBand2—without requiring any extra hardware to be used.

As noted above, the advantages of the present invention are legion. The present invention involves detecting steps while being invariant to the device pose, use-case, and step mode of the user. An adaptive low-pass filter that continuously tunes the cut-off frequency may be used. For this variant, the filter selects the appropriate cut-off frequency and thereby reduces the motion noise in the signal while preserving crucial walking information. Fusion of information from angular rates and magnetic intensity with the acceleration norm may be used for peak detection verification in cases of high angular rates with periodicity. The thresholds used for detection may be adaptively computed during operation to cope with step mode variations and are, generally, independent from user specific information and behavior. As can be imagined, the various aspects of the present invention can be used in any number of ways. The methods and systems of the present invention can be used for accurate step detection. In addition, it can be used for a user's position and, accordingly, as an aid to navigation.

For a better understanding of the present invention, the following references may be consulted:

1. Ojeda, L.; Borenstein, J. Non-GPS navigation for security personnel and first responders. *J. Navig.* 2007, 60, 391-407, doi:10.1017/S0373463307004286.
2. Jimenez, A. R.; Seco, F.; Prieto, J. C.; Guevara, J. Indoor Pedestrian navigation using an INS/EKF framework for yaw drift reduction and a foot-mounted IMU. In *Proceedings of the 2010 7th Workshop on Positioning, Navigation and Communication, WPNC'* 10; 2010.
3. Foxlin, E. Pedestrian tracking with shoe-mounted inertial sensors. *IEEE Comput. Graph. Appl.* 2005, 25, 38-46, doi:10.1109/MCG.2005.140.
4. Pappas, I. P. I.; Popovic, M. R.; Keller, T.; Dietz, V.; Morari, M. A reliable gait phase detection system. *IEEE Trans. Neural Syst. Rehabil. Eng.* 2001, 9, 113-125, doi:10.1109/7333.928571.
5. Yun, X.; Bachmann, E. R.; Moore, H.; Calusdian, J. Self-contained Position Tracking of Human Movement Using Small Inertial/Magnetic Sensor Modules. In *Proceedings* 2007 *IEEE International Conference on Robotics and Automation*; IEEE, 2007; pp. 2526-2533.
6. Young, S. S.; Sangkyung, P. Pedestrian inertial navigation with gait phase detection assisted zero velocity updating. In *ICARA* 2009—*Proceedings of the 4th International Conference on Autonomous Robots and Agents;* 2009; pp. 336-341.
7. Park, S. K.; Suh, Y. S. A zero velocity detection algorithm using inertial sensors for pedestrian navigation systems. *Sensors (Basel).* 2010, 10, 9163-9178, doi:10.3390/s101009163.
8. Xu, Z.; Wei, J.; Zhang, B.; Yang, W. A robust method to detect zero velocity for improved 3d personal navigation using inertial sensors. *Sensors (Switzerland)* 2015, 15, 7708-7727, doi: 10.3390/s150407708.
9. Norrdine, A.; Kasmi, Z.; Blankenbach, J. Step Detection for ZUPT-Aided Inertial Pedestrian Navigation System Using Foot-Mounted Permanent Magnet. *IEEE Sens. J.* 2016, 16, 6766-6773, doi:10.1109/JSEN.2016.2585599.
10. Rawassizadeh, R.; Price, B. A.; Petre, M. Wearables: Has the Age of Smartwatches Finally Arrived? *Commun. ACM* 2014, 58, 45-47, doi:10.1145/2629633.
11. Ravindran, S. Adaptive Step Detection 2013.
12. Modi, Y. R. Wrist Pedometer Step Detection 2014.
13. Case, M. A.; Burwick, H. A.; Volpp, K. G.; Patel, M. S.; SG, T. Accuracy of Smartphone Applications and Wearable Devices for Tracking Physical Activity Data. *JAMA* 2015, 313, 625, doi:10.1001/jama.2014.17841.
14. Huang, Y.; Zheng, H.; Nugent, C.; McCullagh, P.; McDonough, S. M.; Tully, M. A.; Connor, S. O. Activity monitoring using an intelligent mobile phone—A Validation Study. In *Proceedings of the 3rd International Conference on Pervasive Technologies Related to Assistive Environments—PETRA '10*; ACM Press: New York, N.Y., USA, 2010; p. 1.
15. Susi, M.; Renaudin, V.; Lachapelle, G. Motion mode recognition and step detection algorithms for mobile phone users. *Sensors (Switzerland)* 2013, 13, 1539-1562, doi:10.3390/s130201539.
16. Xiao, Z.; Wen, H.; Markham, A.; Trigoni, N. Robust pedestrian dead reckoning (R-PDR) for arbitrary mobile device placement. *IPIN 2014-2014 Int. Conf. Indoor Position. Indoor Navig.* 2015, 187-196, doi:10.1109/IPIN.2014.7275483.
17. Tian, Q.; Salcic, Z.; Wang, K. I.-K.; Pan, Y. A Multi-Mode Dead Reckoning System for Pedestrian Tracking Using Smartphones. *IEEE Sens. J.* 2016, 16, 2079-2093, doi: 10.1109/JSEN.2015.2510364.
18. Lee, H. H.; Choi, S.; Lee, M. J. Step detection robust against the dynamics of smartphones. *Sensors (Switzerland)* 2015, doi:10.3390/s151027230.
19. Kammoun, S.; Pothin, J. B.; Cousin, J. C. An efficient fuzzy logic step detection algorithm for unconstrained smartphones. In *IEEE International Symposium on Personal, Indoor and Mobile Radio Communications, PIMRC*; 2015.
20. Davidson, P.; Piche, R. A Survey of Selected Indoor Positioning Methods for Smartphones. *IEEE Commun. Surv. Tutorials* 2017, 19, 1347-1370, doi:10.1109/COMST.2016.2637663.
21. Ozcan, K.; Velipasalar, S. Robust and Reliable Step Counting by Mobile Phone Cameras. *Proc. 9th Int. Conf. Distrib. Smart Cameras* 2015, 164-169, doi:10.1145/2789116.2789120.
22. Marouane, C.; Ebert, A.; Linnhoff-Popien, C.; Christil, M. Step and activity detection based on the orientation and scale attributes of the SURF algorithm. In *2016 International Conference on Indoor Positioning and Indoor Navigation (IPIN)*; IEEE, 2016; pp. 1-8.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g."C") or an object-oriented language (e.g."C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

What is claimed is:

1. A method for detecting a step of a user from acceleration data of said user's walk, the method comprising:
 a) receiving, at a data processing device, said acceleration data and magnetic intensities data from a mobile data collection device, said mobile data collection device being present on said user and said acceleration data includes angular rates;
 b) determining, using said data processing device, acceleration norms from said acceleration data;
 c) detecting, using said data processing device, peaks and valleys from said acceleration norms, said peaks and valleys being localized maxima and minima when said acceleration norms are plotted;
 d) determining, using said data processing device, dominant angular rates and magnetic intensity axis of motion;
 e) detecting, using said data processing device, peaks and valleys from said dominant axis of motion, said peaks and valleys being localized maxima and minima when said dominant angular rates and magnetic intensity are plotted;
 f) determining, using said data processing device, if said peaks and valleys are valid;
 g) temporally matching, using said data processing device, said peaks and valleys from acceleration, angular rates, and magnetic intensity for enhanced step detection; and
 h) if said peaks and valleys are valid, determining that each peak and valley pair is a detected step,
 wherein said mobile data collection device is a handheld device.

2. A method according to claim 1, wherein step f) comprises performing, using said data processing device, a double integral on said acceleration data for a potential detected step and comparing a result with a predetermined distance threshold.

3. A method according to claim 1, wherein step f) uses gyroscope-based measurements from a gyroscope present in said mobile data collection device.

4. A method according to claim 1, wherein step f) uses magnetometer-based measurements from a magnetometer present in said mobile data collection device.

5. A method according to claim 1, wherein said acceleration data is gathered from Inertial Measurement Units (IMUs) present in said mobile data collection device.

6. A method according to claim 3, wherein step f) comprises determining, using said data processing device, that a peak detected in said acceleration norms is valid if said peak detected in said acceleration norms is within a specific time window of a corresponding peak in said gyroscope-based measurements.

7. A method according to claim 4, wherein step f) comprises determining, using said data processing device, that a peak detected in said acceleration norms is valid if said peak detected in said acceleration norms is within a specific time window of a corresponding peak in said magnetometer-based measurements.

8. A method according to claim 1, wherein step b) comprises calculating, using said data processing device, said acceleration norms according to:

$$a_{norm} = \sqrt[2]{a_x^2 + a_y^2 + a_z^2}$$

where $a_x$, $a_y$, $a_z$=accelerations in specific axes in a body frame; and
$a_{norm}$=acceleration norm.

9. A method according to claim 1, wherein step c) comprises determining a peak by:
  c1) determining, using said data processing device, three successive acceleration norm values;
  c2) determining, using said data processing device, if a middle one of said three successive acceleration norm values is greater than both of said other successive acceleration norm values; and
  c3) if said middle one is greater than said both of said other successive acceleration norm values, setting said middle one as a peak using said data processing device.

10. A method according to claim 1, wherein step c) comprises determining a valley by:
  c1) determining, using said data processing device, three successive acceleration norm values;
  c2) determining, using said data processing device, if a middle one of said three successive acceleration norm values is lesser than both of said other successive acceleration norm values;
  c3) if said middle one is lesser than said both of said other successive acceleration norm values, setting said middle one as a valley using said data processing device.

11. A method according to claim 1, further comprising, applying a filter to said acceleration norms using said data processing device.

12. A method according to claim 11, wherein said filter is an adaptive filter.

13. A method according to claim 12, wherein said filter is an infinite impulse response filter.

14. A method according to claim 1, further comprising applying a temporal filter to said acceleration norms using said data processing device.

15. A method according to claim 14, wherein said filter adaptively tunes a time threshold such that a detected peak is replaced by a peak having a different magnitude.

16. A method according to claim 14, wherein said filter adaptively tunes a time threshold such that a detected valley is replaced by a valley having a different magnitude.

17. A method according to claim 1, wherein said method is used to determine a location of said user.

18. A method according to claim 1, wherein said method is used to track a location of said user.

19. Non-transitory computer-readable media having encoded thereon computer-readable and computer-executable instructions that, when executed, implement a method for detecting a step of a user from acceleration data of said user's walk, the method comprising:
  a) receiving, at a data processing device, said acceleration data and magnetic intensities data from a mobile data collection device, said mobile data collection device being present on said user and said acceleration data including angular rates;
  b) determining acceleration norms from said acceleration data using said data processing device;
  c) detecting peaks and valleys from said acceleration norms using said data processing device, said peaks and valleys being localized maxima and minima when said acceleration norms are plotted;
  d) determining, using said data processing device, dominant angular rates and magnetic intensity axis of motion;
  e) detecting peaks and valleys from said dominant axis of motion using said data processing device, said peaks and valleys being localized maxima and minima when said dominant angular rates and magnetic intensity are plotted;
  f) determining, using said data processing device, if said peaks and valleys are valid;
  g) temporally matching, using said data processing device, said peaks and valleys from acceleration, angular rates, and magnetic intensity for enhanced step detection; and
  h) if said peaks and valleys are valid, determining that each peak and valley pair is a detected step using said data processing device,
  wherein said mobile data collection device is a handheld device.

* * * * *